(12) United States Patent
Nishioka et al.

(10) Patent No.: US 7,995,176 B2
(45) Date of Patent: Aug. 9, 2011

(54) LIQUID CRYSTAL DISPLAY DEVICE

(75) Inventors: Takahiro Nishioka, Tokyo (JP); Tetsuya Satake, Tokyo (JP); Suguru Nagae, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 270 days.

(21) Appl. No.: 12/196,864

(22) Filed: Aug. 22, 2008

(65) Prior Publication Data

US 2009/0059145 A1 Mar. 5, 2009

(30) Foreign Application Priority Data

Aug. 28, 2007 (JP) ................................. 2007-220628
Jun. 20, 2008 (JP) ................................. 2008-161274

(51) Int. Cl.
*G02F 1/1335* (2006.01)
*G02F 1/1337* (2006.01)
(52) U.S. Cl. .......................................... 349/129; 349/19
(58) Field of Classification Search .................. None
See application file for complete search history.

(56) References Cited

U.S. PATENT DOCUMENTS

| | | | | |
|---|---|---|---|---|
| 5,745,206 A * | 4/1998 | Koike et al. | ................. | 349/129 |
| 6,344,889 B1 * | 2/2002 | Hasegawa et al. | ............ | 349/129 |
| 6,801,283 B2 | 10/2004 | Koyama et al. | | |
| 2007/0076152 A1 * | 4/2007 | Ito et al. | ....................... | 349/117 |
| 2007/0165165 A1 * | 7/2007 | Joten | ............................ | 349/119 |

FOREIGN PATENT DOCUMENTS

| | | |
|---|---|---|
| JP | 8-129180 | 5/1996 |
| JP | 10-301113 | 11/1998 |
| JP | 2947350 | 7/1999 |
| JP | 2002-303869 | 10/2002 |
| JP | 3410663 | 3/2003 |
| JP | 2005-195753 | 7/2005 |
| JP | 2005-257809 | 9/2005 |
| JP | 3767419 | 2/2006 |
| JP | 3875125 | 11/2006 |

OTHER PUBLICATIONS

U.S. Appl. No. 12/330,105, filed Dec. 8, 2008, Satake, et al.

* cited by examiner

*Primary Examiner* — Mark A Robinson
*Assistant Examiner* — Mary A El-Shammaa
(74) *Attorney, Agent, or Firm* — Oblon, Spivak, McClelland, Maier & Neustadt, L.L.P.

(57) ABSTRACT

The liquid crystal display device according to this invention includes a control structure provided at each of or one of a liquid crystal side of a first substrate and a liquid crystal side of a second substrate to control a tilt direction of a liquid crystal upon application of a voltage to a liquid crystal layer, a first domain where a liquid crystal tilts in one direction upon application of a voltage to a liquid crystal layer, and a second domain where a liquid crystal tilts in a direction different from the tilt direction of the liquid crystal in the first domain by substantially 180°. Herein, an angle formed by the tilt direction of the liquid crystal in the first domain and a horizontal direction of a screen in the liquid crystal display device falls within a range between 22° and 39° or a range between 51° and 68°.

12 Claims, 20 Drawing Sheets

F I G . 1
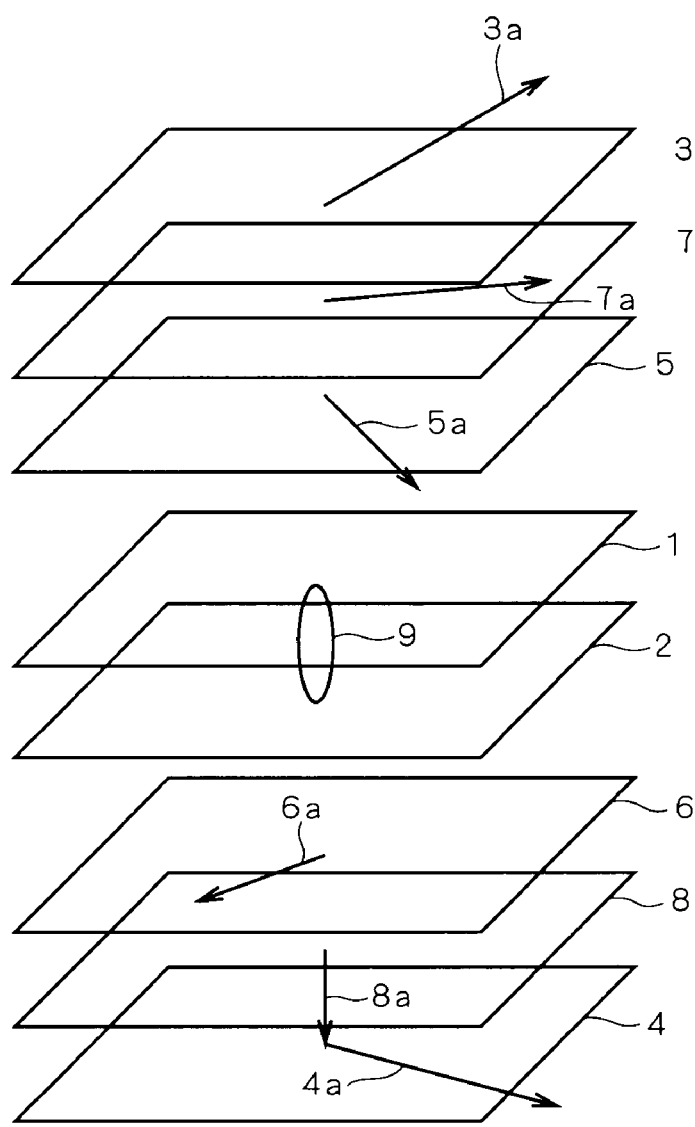

F I G . 5

| POLARIZING PLATE 3 | TRANSMISSION AXIS DIRECTION | 82° |
|---|---|---|
| RETARDATION PLATE 7 | SLOW AXIS DIRECTION | 109° |
| | RETARDATION | 240 nm |
| | N z | 1 |
| RETARDATION PLATE 5 | SLOW AXIS DIRECTION | 0° |
| | RETARDATION | 110 nm |
| | N z | 1.4 |
| RETARDATION PLATE 6 | SLOW AXIS DIRECTION | 90° |
| | RETARDATION | 110 nm |
| | N z | 1.4 |
| RETARDATION PLATE 8 | SLOW AXIS DIRECTION | 19° |
| | RETARDATION | 240 nm |
| | N z | 1 |
| POLARIZING PLATE 4 | TRANSMISSION AXIS DIRECTION | 172° |
| LIQUID CRYSTAL LAYER 9 | Δn・d | 377 nm |
| | TILT DIRECTION IN 11a | 0° |
| | TILT DIRECTION IN 11b | 180° |
| | 11a : 11b AREA RATIO | 1 : 1 |

FIG. 9

| POLARIZING PLATE 3 | TRANSMISSION AXIS DIRECTION | 112° |
|---|---|---|
| RETARDATION PLATE 7 | SLOW AXIS DIRECTION | 157° |
| | RETARDATION | 235 nm |
| | Nz | 1 |
| RETARDATION PLATE 5 | SLOW AXIS DIRECTION | 67° |
| | RETARDATION | 100 nm |
| | Nz | 1 |
| RETARDATION PLATE 6 | SLOW AXIS DIRECTION | 157° |
| | RETARDATION | 100 nm |
| | Nz | 1 |
| RETARDATION PLATE 8 | SLOW AXIS DIRECTION | 67° |
| | RETARDATION | 235 nm |
| | Nz | 1 |
| POLARIZING PLATE 4 | TRANSMISSION AXIS DIRECTION | 22° |
| LIQUID CRYSTAL LAYER 9 | Δn·d | 377 nm |
| | 11a : 11b AREA RATIO | 1 : 1 |

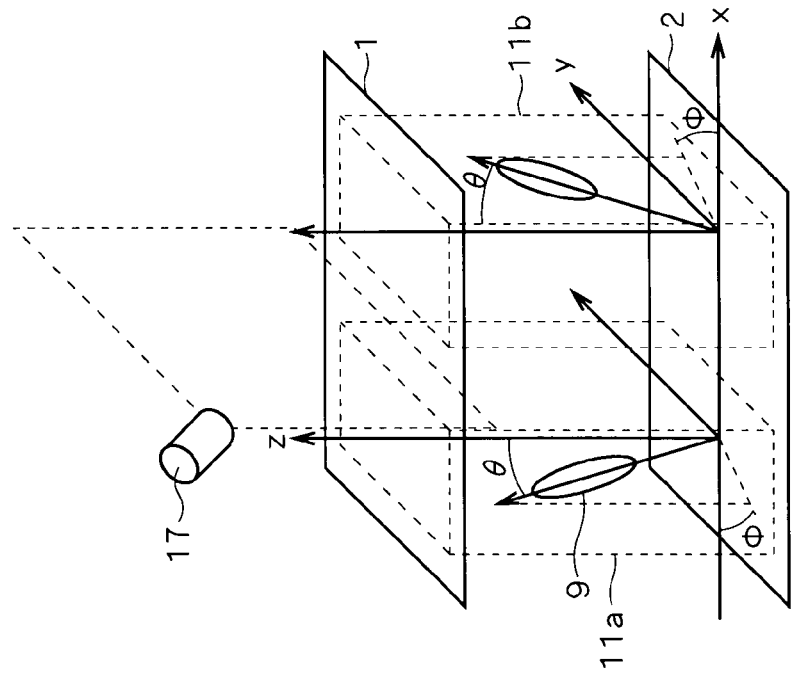
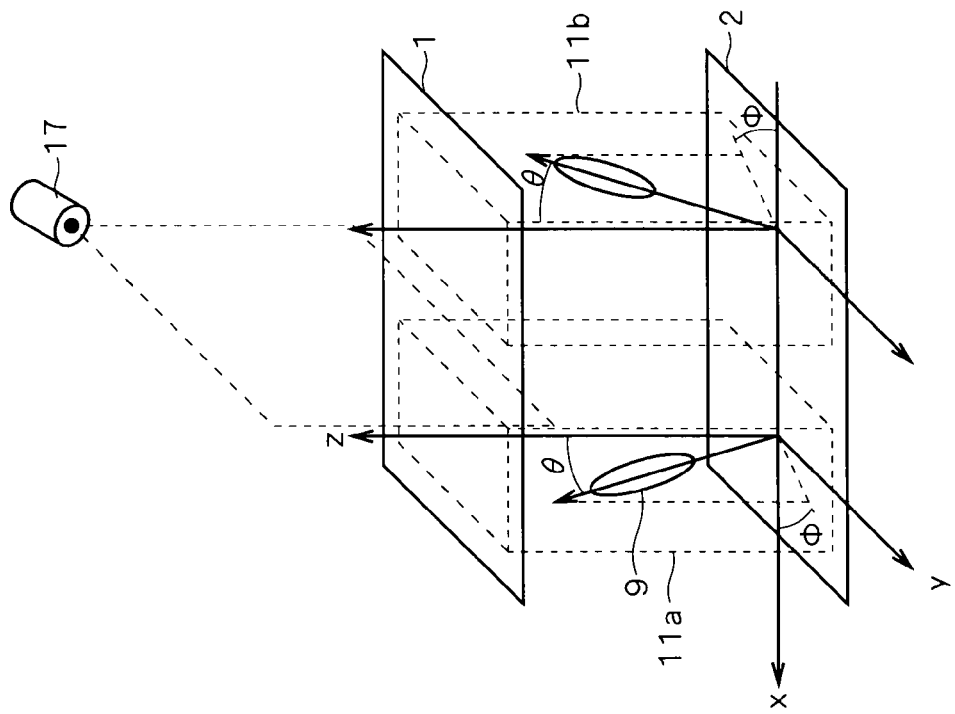

F I G. 1 5
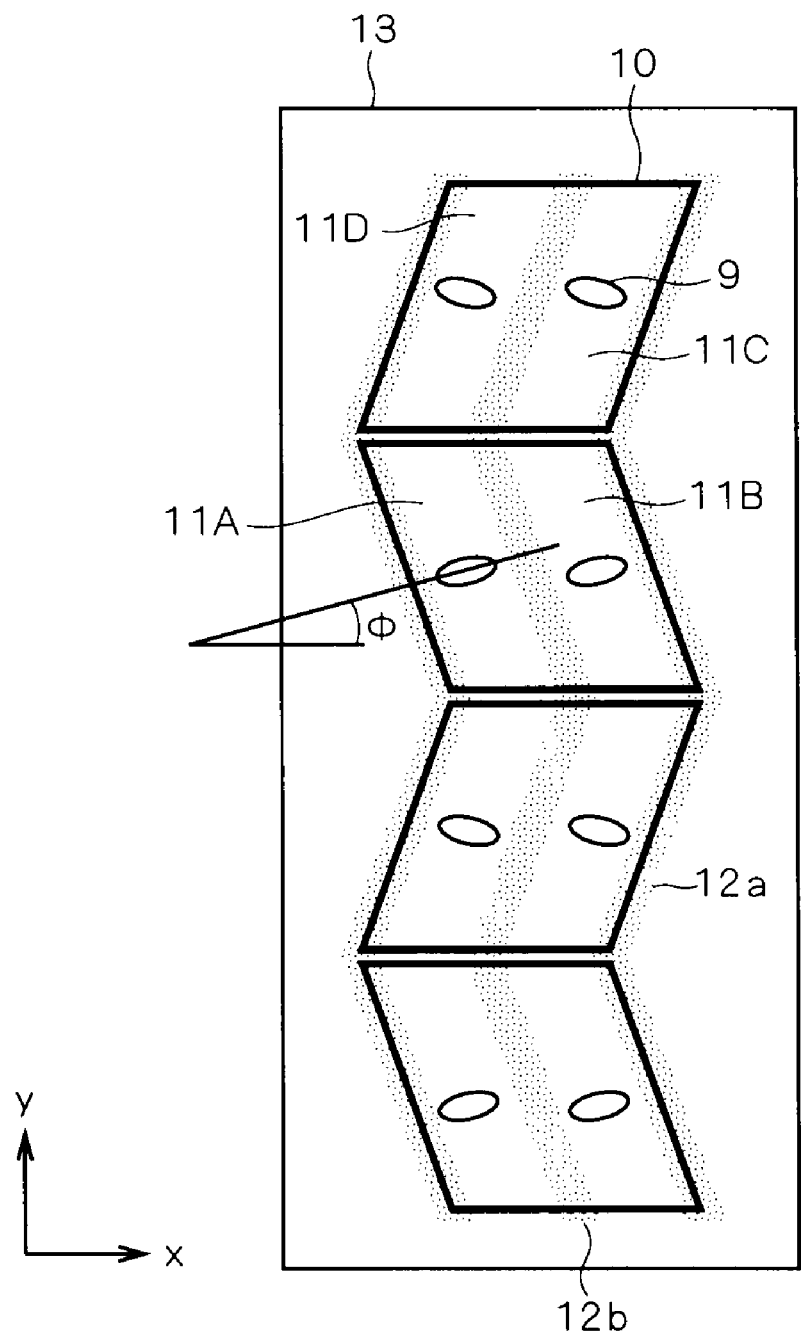

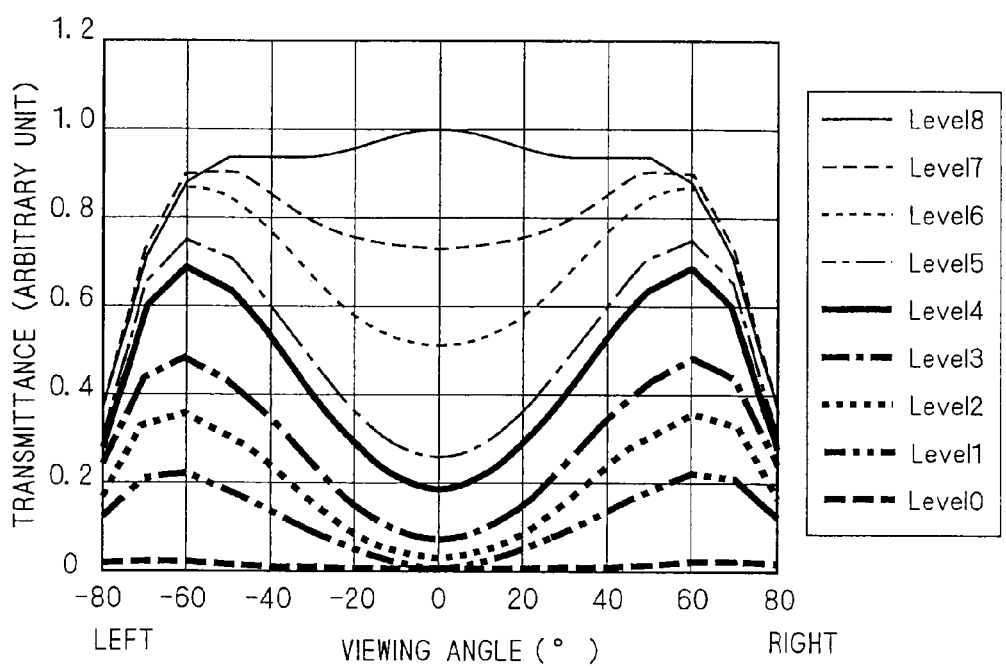
F I G . 2 0

| POLARIZING PLATE 3 | TRANSMISSION AXIS DIRECTION | 120° |
|---|---|---|
| RETARDATION PLATE 5 | SLOW AXIS DIRECTION | 165° |
| | RETARDATION | 140 nm |
| | Nz | 1.6 |
| RETARDATION PLATE 6 | SLOW AXIS DIRECTION | 75° |
| | RETARDATION | 140 nm |
| | Nz | 1.6 |
| POLARIZING PLATE 4 | TRANSMISSION AXIS DIRECTION | 30° |
| LIQUID CRYSTAL LAYER 9 | Δn·d | 377 nm |
| | 11a : 11b AREA RATIO | 1 : 1 |

F I G . 2 6
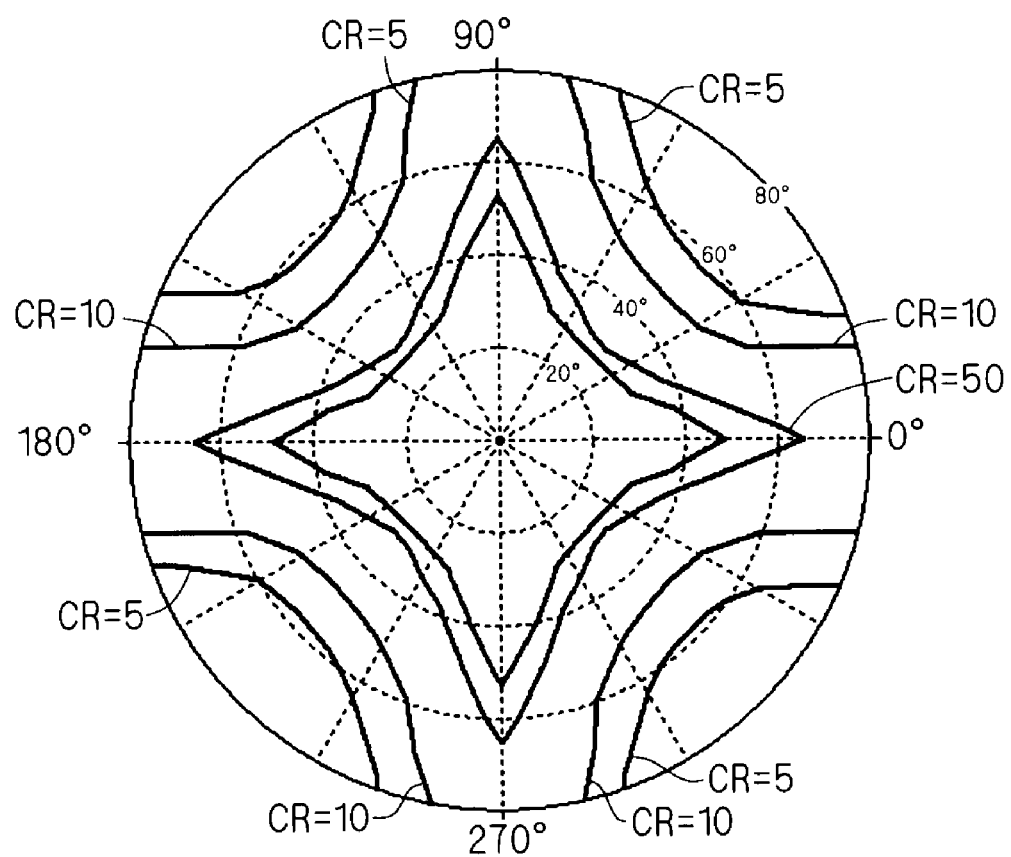

LIQUID CRYSTAL DISPLAY DEVICE

BACKGROUND OF THE INVENTION

1. Field of the Invention

The present invention relates to liquid crystal display devices. In particular, the present invention relates to an MVA (Multi-domain Vertical Alignment) liquid crystal display device.

2. Description of the Background Art

A typical liquid crystal display device realizes liquid crystal display in such a manner that a liquid crystal is held between two substrates at least one of which has an electrode and the electrode applies a voltage to the liquid crystal. Such a liquid crystal display device has been utilized in various uses because of its characteristics including low power consumption, small thickness, light weight and the like. In particular, an active-type liquid crystal display device that includes a TFT (Thin Film Transistor) serving as a switching element for selectively applying a voltage to liquid crystals on different domains in a screen allows high definition and, therefore, has been utilized for a television receiver, a monitor, a small-sized portable appliance and the like.

Display quality of a liquid crystal display device largely depends on an alignment state of a liquid crystal. A TN (Twisted Nematic) liquid crystal display device in which liquid crystals are aligned in a substantially parallel direction with respect to a substrate plane and a difference between alignment directions of the liquid crystals in substrate planes holding the liquid crystals (an angle of twist) is 90° has widely been used because of a higher CR (Contrast Ratio) obtained when a display screen is seen from a front side thereof and excellent production stability. However, the TN liquid crystal display device has the following problems. That is, the CR is remarkably degraded when a line of sight is displaced from the front side of the display screen, that is, a viewing angle becomes narrow. Further, color abnormality is caused due to tone reversal (a phenomenon that an actual display brightness does not increase/decrease monotonously with respect to a tone signal) occurring when the display screen is seen from a specific direction.

In order to solve these problems, a liquid crystal display device that utilizes alignment of a liquid crystal, which is different from that in the TN liquid crystal display device, has been developed and has been in practical use. As one example of such a liquid crystal display device, there is known a VA (Vertical Alignment) liquid crystal display device in which a liquid crystal is aligned in a substantially vertical direction with respect to a substrate plane upon application of no voltage to the liquid crystal.

In particular, there is known an MVA (Multi-domain Vertical Alignment) liquid crystal display device in which a structure that controls a tilt direction of a liquid crystal upon application of a voltage to the liquid crystal is formed in a form of a resin bump or by draft processing of an electrode to obtain divided plural domains which are different in liquid crystal tilt direction from one another. Herein, a display screen is divided into four domains which are different in liquid crystal tilt direction from one another by 90°, respectively, so that each domain is allowed to have a rotational symmetry of 90°. Thus, a viewing angle property can be made symmetrical in a vertical direction and a horizontal direction, so that a viewing angle can be widened (refer to, for example, Japanese Patent No. 2947350 (hereinafter, referred to as Patent Document 1)). Typically, display properties in a vertical direction and a horizontal direction are of importance to a display device. A liquid crystal display device is larger in viewing angle dependency than an electroluminescence display device such as a CRT (Cathode Ray Tube) or a PDP (Plasma Display Panel); therefore, an improvement in viewing angle dependency has been required. It is considered that the high symmetry of the viewing angle property in the MVA liquid crystal display device having the divided four domains is considerably excellent.

The MVA liquid crystal display device disclosed in Patent Document 1 has the following problem. That is, since light to be made incident on the liquid crystal is linearly polarized light, a transmittance of the light in a case where the display screen is seen from the front side thereof is degraded unless the liquid crystal is tilted at an angle of 45° with respect to a transmission axis of a polarizing plate. However, the light to be made incident on the liquid crystal is changed to circularly polarized light by a quarter-wave plate. As a result, when voltages to be applied to the liquid crystals are equal to one another, a single transmittance can be obtained when the display screen is seen from the front side thereof, irrespective of the tilt direction of the liquid crystal (refer to, for example, Japanese Patent Application Laid-Open No. 2002-303869 (hereinafter, referred to as Patent Document 2)).

Moreover, axially symmetrical alignment in which a tilt direction of a liquid crystal successively varies with a specific point being used as a symmetrical center realizes liquid crystal alignment which is considerably high in symmetry without degradation of a transmittance, leading to realization of a viewing angle property which is high in symmetry (refer to, for example, Japanese Patent No. 3875125 (hereinafter, referred to as Patent Document 3)). Herein, the axially symmetrical alignment does not correspond to a definition of MVA, that is, "division of domains" which are different in liquid crystal tilt direction from one another. However, the axially symmetrical alignment can be interpreted as a limit obtained by extrapolation of a divided number at infinity and, therefore, is included in the definition of the MVA in this specification.

As described above, an MVA liquid crystal display device that changes light to be made incident on a liquid crystal from a substrate normal direction to circularly polarized light is described as a circularly polarizing MVA liquid crystal display device in this specification. On the other hand, an MVA liquid crystal display device that changes light to be made incident on a liquid crystal to linearly polarized light is described as a linearly polarizing MVA liquid crystal display device.

Further, addition of a half-wave plate to a position between a polarizing plate and a quarter-wave plate makes it possible to change light to be made incident on a liquid crystal to circularly polarized light in a wide wavelength band, so that it is possible to decrease a brightness in black display in a case where a display screen is seen from a front side thereof and to enhance a CR in the case where the display screen is seen from the front side thereof. In a configuration on a backlight side and a configuration on an observer side, retardations of quarter-wave plates are made equal to each other, retardations of half-wave plates are made equal to each other, transmission axes of polarizing plates are made orthogonal to each other, slow axes of the quarter-wave plates are made orthogonal to each other and slow axes of the half-wave plates are made orthogonal to each other. Herein, a condition for enhancing a CR includes a fact that black display is performed upon application of no voltage to a liquid crystal (refer to, for example, Japanese Patent No. 3767419 (hereinafter, referred to as Patent Document 4)).

Further, an advantage of changing light to be made incident on a liquid crystal to circularly polarized light is to realize a semitransparent or transparent reflective VA liquid crystal display device capable of performing display in a reflection mode in which display is performed through use of outside light and a normal transmission mode in which display is performed through use of backlight in order to improve outdoor visibility (refer to, for example, Japanese Patent No. 3410663 (hereinafter, referred to as Patent Document 5)).

The circularly polarizing MVA liquid crystal display device described above has a feature in that liquid crystal alignment (axially symmetrical alignment) which is high in symmetry can be utilized without degradation in transmittance. In white display, however, there arises the following problem. That is, a transmittance is increased by enhancement of a retardation of a liquid crystal layer in such a manner that a thickness of the liquid crystal layer is made large, a birefringence of a liquid crystal material is made large or a voltage to be applied to a liquid crystal is made high, resulting in occurrence of tone reversal in a horizontal direction and a vertical direction of a liquid crystal display device.

In a conventional liquid crystal display device, a high CR, a wide viewing angle and an excellent symmetry have been required; therefore, a liquid crystal having a high symmetry must be aligned. In order to resolve the tone reversal described above, moreover, a transmittance must be decreased. In recent years, however, the liquid crystal display device has been utilized in a use as a liquid crystal display device for a vehicle or a liquid crystal display device for a ticket vending machine which does not necessarily require an isotropic viewing angle property, in accordance with improvement in durability of components and enlargement of a use temperature range. For example, the liquid crystal display device for a vehicle requires high display quality in a horizontal direction. However, display quality in a vertical direction is not necessarily higher than that in the horizontal direction because a positional relation between a head of a user and a panel is substantially fixed in the vertical direction. On the other hand, the liquid crystal display device for a ticket vending machine or an ATM does not require the display quality in the horizontal direction, but requires the display quality in the vertical direction in order to respond to change of a viewing angle in the vertical direction because the viewing angle in the vertical direction varies in accordance with a height and a standing position of a user.

SUMMARY OF THE INVENTION

An object of the present invention is to provide a liquid crystal display device that ensures high display quality causing no tone reversal even at a high transmittance in a use which does not necessarily require an isotropic viewing angle property, but requires high display quality in a specific direction.

The liquid crystal display device according to the present invention includes: a first substrate that has electrodes provided at regular intervals to apply a voltage to a liquid crystal; a second substrate that has an electrode applying a voltage to a liquid crystal; a liquid crystal layer that is held between the first substrate and the second substrate and is made of a negative type liquid crystal aligned in a substantially vertical direction with respect to a substrate plane; a first polarizing plate that is provided at a side which is different from a liquid crystal side of the first substrate; a second polarizing plate that is provided at a side which is different from a liquid crystal side of the second substrate, and has a transmission axis which is orthogonal to a transmission axis of the first polarizing plate; a first retardation plate that is provided between the first substrate and the first polarizing plate, and has a slow axis which is not parallel with and orthogonal to the transmission axis of the first polarizing plate; a second retardation plate that is provided between the first substrate and the first retardation plate; a third retardation plate that is provided between the second substrate and the second polarizing plate, and has a slow axis which is orthogonal to the slow axis of the first retardation plate; a fourth retardation plate that is provided between the second substrate and the third retardation plate, and has a slow axis which is orthogonal to a slow axis of the second retardation plate; a control structure that is provided at each of or one of the liquid crystal side of the first substrate and the liquid crystal side of the second substrate, and controls a tilt direction of the liquid crystal upon application of the voltage to the liquid crystal layer; a first domain where the liquid crystal tilts in one direction upon application of the voltage to the liquid crystal layer; and a second domain where the liquid crystal tilts in a direction which is different from the tilt direction of the liquid crystal in the first domain by substantially 180°. Herein, an angle formed by the tilt direction of the liquid crystal in the first domain and a horizontal direction of a screen in the liquid crystal display device falls within a range between 22° and 39° or a range between 51° and 68°.

According to the present invention, the angle formed by the tilt direction of the liquid crystal in the first domain and the horizontal direction of the screen in the liquid crystal display device falls within the range between 22° and 39° or the range between 51° and 68°. Therefore, the present invention can provide a liquid crystal display device that ensures high display quality causing no tone reversal even at a high transmittance in a use which does not necessarily require an isotropic viewing angle property, but requires high display quality in a specific direction.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 schematically shows a configuration of a circularly polarizing MVA liquid crystal display device according to embodiments of the present invention;

FIG. 5 shows parameters of respective constituent components of the liquid crystal display device according to the first embodiment of the present invention;

FIG. 9 shows parameters of the respective constituent components of the liquid crystal display device according to the first embodiment of the present invention;

FIGS. 13A and 13B show a fact that the optical property becomes symmetrical by the division into the two domains which are different in liquid crystal tilt direction from each other by 180° in the embodiments of the present invention;

FIG. 15 schematically shows a liquid crystal display device according to a second embodiment of the present invention in a case where the liquid crystal display device is seen from a front side thereof;

FIG. 20 shows a simulation result of a viewing angle dependency of a transmittance in the liquid crystal display device according to the second embodiment of the present invention;

FIG. 26 shows a simulation result of a viewing angle and a viewing direction which are equal in CR to each other in the parameters shown in FIG. 22 in the fourth embodiment of the present invention.

DESCRIPTION OF THE PREFERRED EMBODIMENTS

Figure 2:
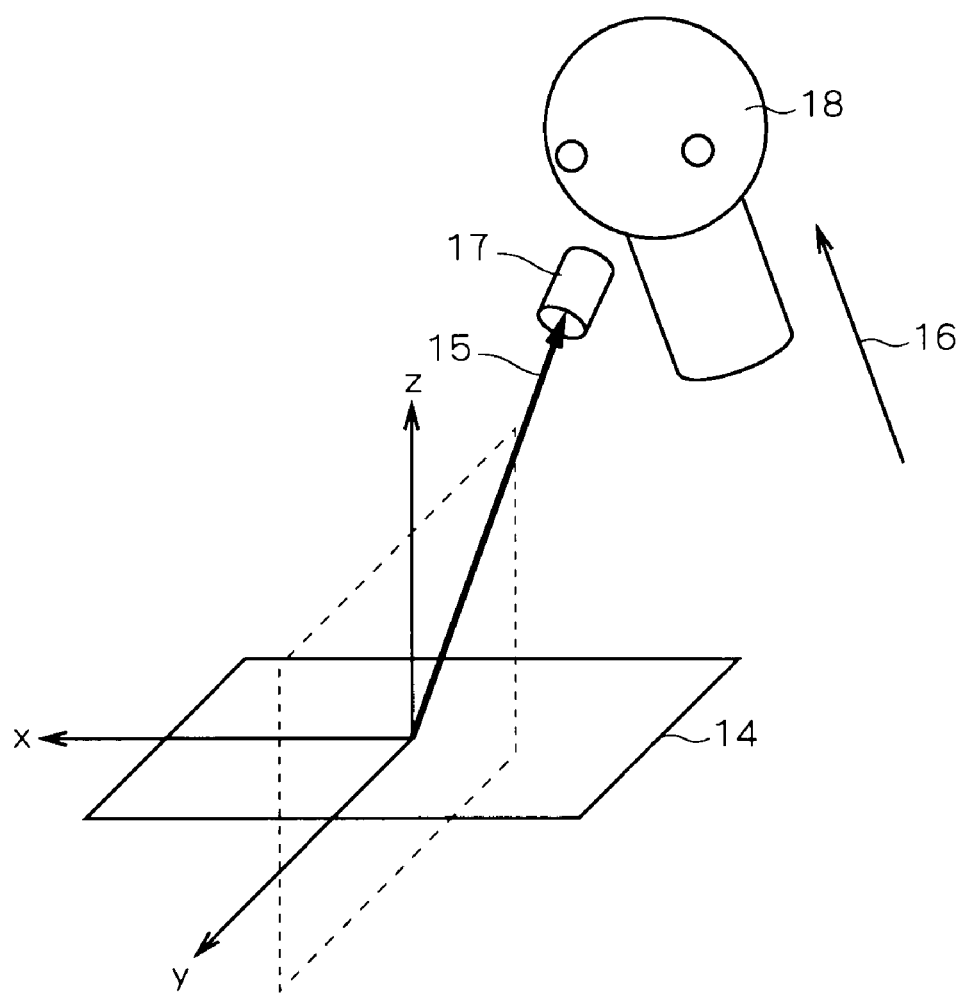
FIG. 2 shows a positional relation between the liquid crystal display device according to the embodiments of the present invention and a observer.

With reference to the drawings, hereinafter, description will be given of preferred embodiments of the present invention.

First Embodiment

FIG. 1 schematically shows a configuration of a circularly polarizing MVA liquid crystal display device according to the embodiments of the present invention. A liquid crystal layer 9 made of a negative type liquid crystal is held between a substrate 1 and a substrate 2. Although not shown in FIG. 1, an electrode and an auxiliary capacitor electrode each applying a voltage to a liquid crystal, a switching element such as a TFT controlling the voltage application, and a wire are provided at regular intervals at a liquid crystal side of the substrate 1 while an electrode applying a voltage to a liquid crystal is provided at a liquid crystal side of the substrate 2. Each of the liquid crystal side of the substrate 1 and the liquid crystal side of the substrate 2 is subjected to processing such as formation of a vertical alignment film such that the liquid crystal layer 9 is aligned in a substantially vertical direction with respect to a substrate plane upon application of no voltage to the liquid crystal layer 9. The alignment direction of the liquid crystal layer 9 is not particularly limited as long as it is substantially vertical to the substrate, and the liquid crystal layer 9 may tilt within a range up to 10° with respect to a vertical direction. For example, the alignment direction of the liquid crystal layer 9 may be slightly tilted with respect to the vertical direction in such a manner that the vertical alignment film is formed so as to have a slight tilt. In order to achieve a larger contrast ratio, however, this tilt desirably falls within a range up to 5°.

In order to realize display in a transmission mode, openings for allowing light to transmit therethrough are formed at a part of a domain where the electrode is provided on the substrate 1 and a portion opposite to the part on the substrate 2 in the liquid crystal display device according to the embodiments of the present invention. In at least the opening, the substrate is made of a clear substrate material having a high transmittance such as glass or amorphous plastic while the electrode is made of a clear electrode material having a high transmittance such as ITO (Indium Tin Oxide) or IZO (Indium Zinc Oxide).

In the embodiments of the present invention, the circularly polarizing MVA liquid crystal display device in the transmission mode is described as a transparent liquid crystal display device. However, the circularly polarizing MVA liquid crystal display device can be used as a semitransparent liquid crystal display device. Therefore, a domain for performing display in a reflection mode may be formed in addition to the opening in the embodiments of the present invention.

A polarizing plate 3 is provided at a different side of the substrate 1 from the liquid crystal side while a polarizing plate 4 is provided at a different side of the substrate 2 from the liquid crystal side. Herein, a transmission axis 3a of the polarizing plate 3 and a transmission axis 4a of the polarizing plate 4 are orthogonal to each other. Accordingly, an absorption axis of the polarizing plate 3 and an absorption axis of the polarizing plate 4 are also orthogonal to each other because the absorption axis is orthogonal to the transmission axis. A retardation plate 7 is provided between the substrate 1 and the polarizing plate 3 such that a slow axis 7a indicating a direction of a largest refractivity in the retardation plate 7 is not parallel with and orthogonal to the transmission axis 3a of the polarizing plate 3. A retardation plate 5 is provided between the substrate 1 and the retardation plate 7. A retardation plate 8 is provided between the substrate 2 and the polarizing plate 4 such that a slow axis 8a thereof is orthogonal to the slow axis 7a of the retardation plate 7. A retardation plate 6 is provided between the substrate 2 and the retardation plate 8 such that a slow axis 6a thereof is orthogonal to the slow axis 5a of the retardation plate 5.

The circularly polarizing MVA liquid crystal display device may not include the retardation plate 7 and the retardation plate 8. In the embodiments of the present invention, however, the circularly polarizing MVA liquid crystal display device having the configuration described above is described.

When this liquid crystal display device is seen from a front side thereof, that is, when this liquid crystal display device is seen from a normal direction (a z-axis direction) of the substrate 1, a retardation of the liquid crystal layer 9 is zero unless a voltage is applied to the liquid crystal layer 9. Therefore, a polarization status of light transmitting through the liquid crystal layer 9 does not vary. As shown in FIG. 1, when the transmission axis 3a and the transmission axis 4a, the slow axis 5a and the slow axis 6a, and the slow axis 7a and the slow axis 8a are made orthogonal to each other, respectively, such that a retardation of the retardation plate 5 and a retardation of the retardation plate 6, and a retardation of the retardation plate 7 and a retardation of the retardation plate 8 are made equal to each other, respectively, then, the respective retardations are cancelled, leading to realization of a darkest display status in principle as black display. Herein, the polarizing plates and the retardation plates can not be accurately made orthogonal to each other with ease, respectively; however, a deviation within a range of ±10° is allowable as disclosed in Patent Document 4. Although depending on manufacturing conditions, a normal deviation falls within a range of about ±2° or about ±3° at most. Therefore, such a deviation causes no practical problems in particular.

Each of the retardation of the retardation plate 7 and the retardation of the retardation plate 8 is set at a half of a predetermined wavelength $\lambda$ (a half-wave plate) while each of the retardation of the retardation plate 5 and the retardation of the retardation plate 6 is set at a quarter of the predetermined wavelength $\lambda$ (a quarter-wave plate). Thus, each of a combination of the retardation plate 5 and the retardation plate 7 and a combination of the retardation plate 6 and the retardation plate 8 has a function as a circularly polarizing plate in a wide band about the predetermined wavelength $\lambda$.

For example, it is assumed herein that the predetermined wavelength $\lambda$ is set at 550 nm at which a human luminosity becomes maximal. Then, each of the retardation of the retardation plate 7 serving as the half-wave plate and the retardation of the retardation plate 8 serving as the half-wave plate is obtained from an equation of 550 nm/2=275 nm. On the other hand, each of the retardation of the retardation plate 5 serving as the quarter-wave plate and the retardation of the retardation plate 6 serving as the quarter-wave plate is obtained from an equation of 550 nm/4=137.5 nm. On such conditions, light to be made incident on the liquid crystal layer 9 is changed to complete circularly polarized light at the predetermined wavelength $\lambda$ (550 nm). Therefore, when the effective retardation of the liquid crystal layer 9 is set at a half wavelength (275 nm) by application of a voltage to the liquid crystal layer 9, a transmittance becomes maximal in principle, leading to realization of white display at the highest transmittance. However, the light at the wavelength of 550 nm is yellow green light; therefore, the white display becomes yellow green in color with ease in the settings described above. Accordingly, the predetermined wavelength $\lambda$ is set at a value smaller than 550 nm, so that a balance between a maximum transmittance and a color property is achieved. Even when the half retardation of the predetermined wavelength $\lambda$ and the quarter retardation of the predetermined wavelength $\lambda$ are not strict, the transmittance and the color merely vary in some degree. Therefore, the half retardation of the predetermined wavelength $\lambda$ and the quarter retardation of the predetermined wavelength $\lambda$ are not necessarily set strictly except a case where a maximum transmittance in principle is required. In place of the adjustment of the retardation of the half-wave plate and the retardation of the quarter-wave plate, the balance between the transmittance and the color may be achieved in such a manner that the voltage to be applied to the liquid crystal layer 9 is kept to be low. If the retardation of the half-wave plate is not strictly set at $\lambda/2$ and the retardation of the quarter-wave plate is not strictly set at $\lambda/4$, the resultant polarized light is not complete circularly polarized light, but elliptically polarized light. However, the circularly polarizing MVA liquid crystal display device according to the first embodiment of the present invention has a feature in that a value four times as large as the retardation of the quarter-wave plate and a value twice as large as the retardation of the half-wave plate fall within a visible range (between 380 nm and 780 nm). However, the retardation of the retardation plate 5 and the retardation of the retardation plate 6, and the retardation of the retardation plate 7 and the retardation of the retardation plate 8 must be made equal to each other, respectively.

As described above, one of conditions for realizing the darkest black display in principle is that the retardation of the retardation plate 5 and the retardation of the retardation plate 6, and the retardation of the retardation plate 7 and the retardation of the retardation plate 8 are equal to each other, respectively. If the retardations are different, light disadvantageously transmits through the liquid crystal layer 9 in some degree even when no voltage is applied to the liquid crystal layer 9, resulting in failure of enhancement of a CR. Each retardation has an allowance of about ±30 nm (refer to Patent Document 4); however, such an allowance causes no practical problems since a retardation of a resin stretched film which is a typically used retardation plate has a deviation of about ±10 nm at most. There is a possibility that the value of the deviation described above deviates from a target retardation value like retardation plates cut from a single original roll. However, if an amount of the deviation is single, the transmittance in the black display is considerably small. Herein, the CR varies in some degree since the transmittance in the white display varies in some degree.

Retardation plates for use in an MVA liquid crystal display device are classified into the following three types based on a magnitude relation among main values n1 and n2 of a refractivity in a substrate plane and a main value n3 of a refractivity in a normal direction in a case where main axes of the refractivity are oriented in a normal direction of a substrate and a parallel direction with respect to the substrate, respectively. As the first classification, there is a retardation plate which has a relation of n1>n2=n3 and is called a (positive) a-plate. As the second classification, next, there is a retardation plate which has relations of n1>n2, n1>n3 and n2≠n3 and is called a biaxial retardation plate. These two retardation plates are different in refractivities n1 and n2 in the substrate plane and, therefore, have a retardation which is other than zero, respectively. The retardation plates described above can be used as the retardation plates 5 to 8, respectively. As the third classification, moreover, there is a retardation plate which has a relation of n1=n2>n3 and is called as a (negative) c-plate. This retardation plate has a retardation of zero since the refractivity n1 is equal to the refractivity n2, but is used for widening a viewing angle. This c-plate has a single refractivity in a plane and the refractivity is maximal; therefore, a direction of a slow axis can not be defined. In the present invention, however, the c-plate may be used in addition to the retardation plates 5 to 8.

In order to represent the classification described above as a numeric value, an equation of $Nz=(n1-n3)/(n1-n2)$ is used.

In the foregoing description, the retardation of the retardation plate is represented as $(n1-n2) \cdot t$, in which t denotes a thickness of the retardation plate. This corresponds to a representation of an optical phase difference on a wavelength basis, and the optical phase difference is given to polarized light which is made incident on the retardation plate from a front side of the retardation plate. The phase difference is 360° at one wavelength. Moreover, the effective retardation of the liquid crystal layer 9 is a representation of an optical phase difference on a wavelength basis, and the optical phase difference is given to polarized light which transmits through the liquid crystal layer 9.

Although not shown in FIG. 1, a color filter is provided in a case where color display is performed through use of the color filter. The color filter is interposed between the substrate 1 or 2 and the liquid crystal layer 9 in order to prevent color mixing or color spreading due to parallax. Moreover, a backlight unit (not shown) is provided at an opposite side of the polarizing plate 3 or 4 to the substrate 1 or 2. An observer sees the display from the opposite side to the side where the backlight unit is provided. In addition, there are provided a drive circuit (not shown) that generates a signal indicating the voltage to be applied to the liquid crystal layer 9 from an image signal and generates a control signal for a switching element such as a TFT in order to control voltage application to a liquid crystal layer 9 on a different domain in the display screen, and a wire (not shown) that supplies various signals to the wire provided on the substrate 1.

It is to be noted that the liquid crystal display device occasionally refers to a device having a substrate, a retardation plate, a polarizing plate, a backlight unit, a drive circuit, a wire and the like each housed in a casing and displaying an image only by supply of an image signal and a voltage. In addition, a device having no backlight unit and drive circuit and displaying an image by input of an external voltage signal, an external control signal and external light is also subsumed under the liquid crystal display device. In the present invention, all the devices configured as described above are subsumed under the liquid crystal display device.

In the foregoing description, the circularly polarizing MVA liquid crystal display device uses the quarter-wave plate and the half-wave plate. Next, description will be given of features of the present invention, that is, a tilt direction of the liquid crystal upon application of a voltage to the liquid crystal layer 9 and a positional relation between a tilt direction control structure that controls the tilt direction and a user of the liquid crystal display device.

FIG. 2 shows the positional relation between the liquid crystal display device 14 according to the embodiments of the present invention and the observer 18. Herein, a line of sight 15 of the observer 18 is defined as a vector directed from an evaluation domain, evaluated by the observer 18, in the liquid crystal display device 14 toward a measuring instrument 17. Herein, the vector connects between a center of the evaluation domain and a center of a light receiving part of the measuring instrument 17. The definition is made on assumption that the observer conducts the evaluation through use of the measuring instrument 17; however, the vector may be a vector connecting between a domain typically receiving attention of a user and the user.

Next, an xyz orthogonal coordinate system is defined. As shown in FIG. 2, a z axis is parallel with the normal direction of the substrate, and a direction from a surface of the liquid crystal display device 14 to a side where the observer 18 exists is defined as a positive direction of the z axis. An x axis and a y axis are parallel with the substrate plane (in a case where the substrate is warped, a tangential plane of the evaluation domain is defined as the substrate plane.) An image is displayed such that the x axis is approximately orthogonal to a plumb direction 16 and the xyz coordinate system is on a right side. A direction to a right side of the observer 18 (a left direction in FIG. 2) is defined as a positive direction of the x axis. This x-axis direction is defined as a horizontal direction of a screen in the liquid crystal display device 14, and a y-axis direction is defined as a vertical direction of the screen in the liquid crystal display device 14. With the xyz coordinate system described above, the observer 18 sees an image from the right direction in FIG. 2 when a projection of the line of sight 15 of the observer 18 onto the x axis is in the positive direction of the x axis while the observer 18 sees the image from the left direction in FIG. 2 when the projection of the line of sight 15 of the observer 18 onto the x axis is in the negative direction of the x axis. Likewise, the observer 18 sees the image from the up direction in FIG. 2 when a projection of the line of sight 15 of the observer 18 onto the y axis is in the positive direction of the y axis while the observer 18 sees the image from the down direction in FIG. 2 when the projection of the line of sight 15 of the observer 18 onto the y axis is in the negative direction of the y axis.

It is assumed herein that the direction of the line of sight refers to the projection of the line of sight 15 of the observer 18 onto an xy plane. In a case of no possibility of misrecognition, an angle formed by the projection described above and the positive direction of the x axis (an azimuth angle) is also described as the direction of the line of sight (a viewing direction). When the viewing direction is 0°, the observer 18 sees the liquid crystal display device 14 from the exactly right side of the liquid crystal display device 14. An angle of the line of sight is defined as an angle formed by the line of sight 15 of the observer 18 and the z axis (a polar angle). When the viewing angle is 0°, the z axis and the line of sight 15 of the observer 18 become parallel with each other. That is, the observer sees the liquid crystal display device 14 from the front side of the liquid crystal display device 14.

The liquid crystal used in the MVA liquid crystal display device is of the negative type, and a dielectric constant of the liquid crystal in a major axis direction is smaller than a dielectric constant of the liquid crystal in a direction orthogonal to the major axis direction. Therefore, when a voltage is applied to the liquid crystal layer 9, a torque is produced in a direction that the major axis direction of the liquid crystal is orthogonal to a line of electric force. When a planar electrode is provided on the substrate which is opposite to the planar electrode in parallel, the line of electric force is parallel with the z axis; therefore, the liquid crystal tilts from the z-axis direction by voltage application. Herein, the projection of the vector parallel with the major axis of the liquid crystal onto the substrate plane (xy plane) is defined as the liquid crystal tilt direction. Moreover, the angle formed by the projection and the positive direction of the x axis (the azimuth angle) is described as the liquid crystal tilt direction in a case of no possibility of misrecognition. If the liquid crystal tilt direction is 0°, the liquid crystal tilts in the exactly right direction when being seen from the observer.

In a case where a voltage is applied to the negative type liquid crystal vertically aligned with respect to the sufficiently wide planar electrode, when the major axis direction of the liquid crystal is completely parallel with the line of electric force, the torque is evenly applied to the liquid crystal in all directions, so that the liquid crystal is fixed. In actual, however, if the liquid crystal tilts at a portion where the line of electric force is contorted, such as an end of the electrode, the torque propagates due to elasticity. Then, the torque is acted in an appropriate direction at a portion in the liquid crystal screen, so that the liquid crystal tilts from the z-axis direction to the appropriate direction. In the case of the linearly polarizing MVA liquid crystal display device, the transmittance is degraded unless the liquid crystal tilt direction is set at 45° with respect to the transmission axis of the polarizing plate. In order to solve this problem, a technique of controlling the liquid crystal tilt direction has been developed and has publicly been known (refer to, for example, Patent Document 1). As described above, it is assumed herein that the linearly polarizing MVA liquid crystal display device is subsumed under an MVA liquid crystal display device in which light to be made incident on a liquid crystal is linearly polarized light.

Figure 3A:
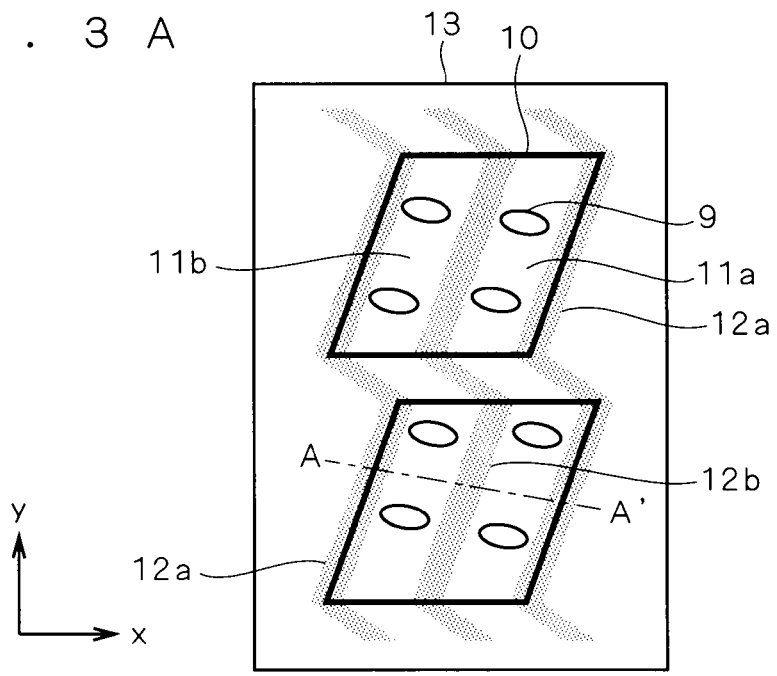
FIG. 3A schematically shows the liquid crystal display device according to the first embodiment of the present invention in a case where the liquid crystal display device is seen from a front side thereof.
Figure 3B:
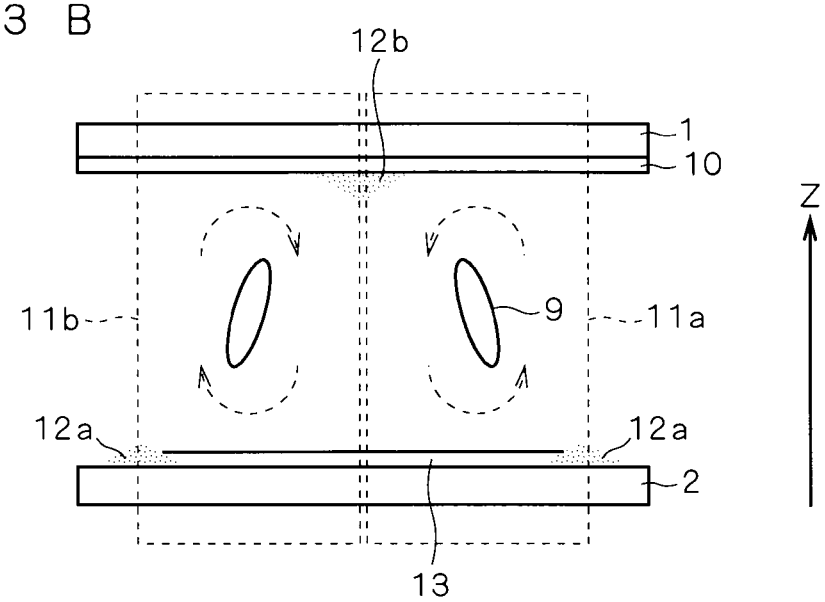
FIG. 3B shows a sectional view of the liquid crystal display device according to the first embodiment of the present invention.

FIG. 3A schematically shows the liquid crystal display device 14 according to the first embodiment of the present invention in a case where the liquid crystal display device 14 is seen from the front side thereof, and FIG. 3B shows a sectional view of the liquid crystal display device 14 according to the first embodiment of the present invention in the case where the liquid crystal display device 14 is seen from the front side thereof. As shown in FIG. 3A, the electrodes 10 are provided at regular intervals at the liquid crystal side of the substrate 1 so as to apply a voltage to the liquid crystal. Herein, the number of structures described above is two in FIG. 3A. In actual, two or more structures described above are provided at regular intervals throughout the entire display screen. In FIGS. 3A and 3B, the electrode 13 at the side of the substrate 2 is formed into a rectangular shape to cover the entire display screen of the liquid crystal display device 14. As will be described later, the electrode 13 may be removed partly in order to control the liquid crystal tilt direction. FIG. 3B is the sectional view taken along a line A-A' in FIG. 3A. Herein, the auxiliary capacitor electrode, the switching element such as the TFT, the wire and the like are not shown in FIGS. 3A and 3B.

As shown in FIGS. 3A and 3B, resin bumps 12a and 12b are formed for controlling the liquid crystal tilt direction (the direction in which the liquid crystal tilts by voltage application, hereinafter simply referred to as a tilt direction). Although not shown in FIGS. 3A and 3B, vertical alignment processing is performed for covering the electrodes 10 and 13 as well as the resin bumps 12a and 12b. At an oblique surface of the resin bump 12a or 12b upon application of no voltage, accordingly, the liquid crystal is aligned vertically with respect to the oblique surface. Therefore, the liquid crystal at the oblique surface slightly tilts from the z axis. When the voltage is applied in this state, the liquid crystal at the oblique surface tilts in a direction parallel with a projection of a normal line of the oblique surface onto the xy plane. As shown by a dashed arrow mark in FIG. 3B, the liquid crystal other than the liquid crystal at the oblique surface also tilts in the same direction. The structure shown in FIGS. 3A and 3B allows formation of a domain 11a and a domain 11b which are different in liquid crystal tilt direction from each other by approximately 180°.

In FIGS. 3A and 3B, each of the resin bumps 12a and 12b has a triangular sectional shape. However, the shape of the resin bump is not particularly limited thereto as long as the resin bump has an oblique surface. For example, the resin bump may have a dome-shaped sectional shape. Alternatively, a recess may be formed in place of the bump.

Like the oblique portion described above, the liquid crystal tilts in the tilt direction even when the alignment of the liquid crystal is tilted with respect to the vertical direction upon application of no voltage by execution of rubbing processing or optical aligning processing. In order to realize MVA, however, a direction of an initial tilt must be changed partly in the substrate plane (that is, an initial tilt direction must be subjected to patterning), resulting in complication of manufacturing steps. In the patterning, moreover, alignment accuracy to be required is considerably high, which is disadvantageous in terms of productivity.

Figure 4A:
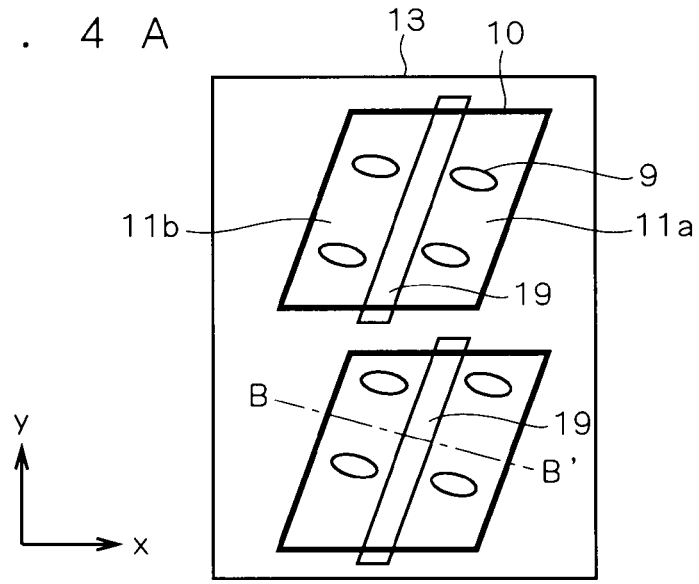
FIG. 4A schematically shows the liquid crystal display device according to the first embodiment of the present invention in the case where the liquid crystal display device is seen from the front side thereof.
Figure 4B:
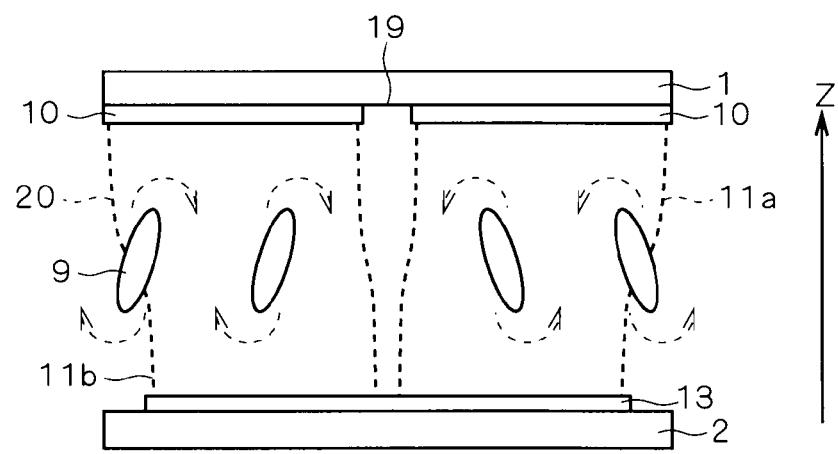
FIG. 4B shows a sectional view of the liquid crystal display device according to the first embodiment of the present invention.

FIG. 4A schematically shows the liquid crystal display device 14 according to the first embodiment of the present invention in the case where the liquid crystal display device 14 is seen from the front side thereof, and FIG. 4B shows a sectional view of the liquid crystal display device 14 according to the first embodiment of the present invention. As shown in FIGS. 4A and 4B, the electrode corresponding to the portion where the bump is formed in FIGS. 3A and 3B is removed, and a slit is formed as a structure for controlling the liquid crystal tilt direction, in place of the resin bump. As shown in FIG. 4A, the electrodes 10 are provided at regular intervals at the liquid crystal side of the substrate 1 so as to apply a voltage to the liquid crystal. FIG. 4B is the sectional view taken along a line B-B' in FIG. 4A. Herein, the auxiliary capacitor electrode, the switching element such as the TFT, the wire and the like are not shown in FIGS. 4A and 4B. The line of electric force 20 is contorted at an end of a slit 19 and a portion near the end of the electrode 10 so as to be perpendicular to the surface of the electrode 10. Accordingly, the liquid crystal near the contorted line of electric force 20 tilts such that the major axis direction of the liquid crystal is vertical to the contorted line of electric force 20. As in the structure shown in FIGS. 3A and 3B, the domain 11a and the domain 11b which are different in liquid crystal tilt direction from each other by approximately 180° are formed.

In the embodiments of the present invention, the slit is formed by removing the electrode by design in order to control the liquid crystal tilt direction. In addition, the end of the electrode is an interface portion between a portion where the electrode exists and a portion where no electrode exists, and controls the liquid crystal tilt direction through use of the distortion of the line of electric force. Therefore, the end of the electrode can be regarded as the slit. Thus, both the forms described above are defined as a slit herein. Alternatively, a bump and a slit may be used in combination in such a manner that the bump is formed on the substrate 1 and the slit is formed on the substrate 2, for example. Although not shown in FIGS. 3A and 4A, the opening is formed such that an overlap between the domains 11a and 11b has an almost equal area in the case where the opening is seen from a front side thereof.

With regard to a structure for controlling the liquid crystal tilt direction, such as the bump, the slit, and the end of the electrode (a control structure), an optional direction can be set as the liquid crystal tilt direction by change of a formation direction of such a structure. In the first embodiment of the present invention, an extension direction of the oblique surface (a control structure extension direction) tilts with respect to the x axis within a range between 22° and 39° or a range between 51° and 68° in order to control the liquid crystal tilt direction in one of the two domains 11a and 11b which are different in liquid crystal tilt direction from each other by 180°. Hereinafter, description will be given of the reason for determining the angular range of the liquid crystal tilt direction.

Figure 6:
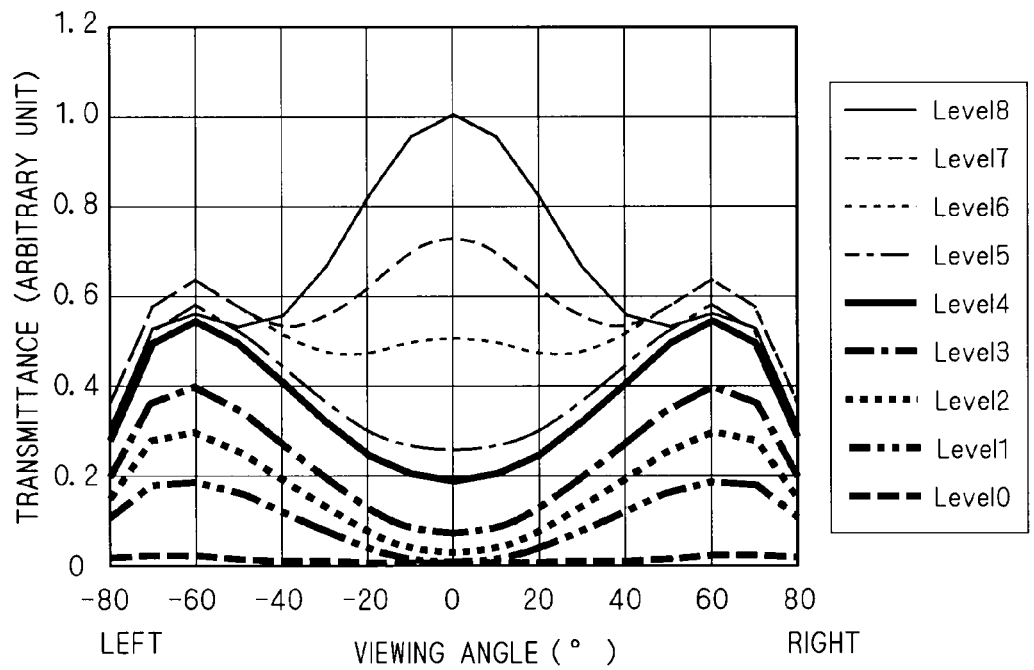
FIG. 6 shows a simulation result of a viewing angle dependency of a transmittance in the liquid crystal display device according to the first embodiment of the present invention.

FIG. 5 shows parameters of the respective constituent components of the liquid crystal display device 14 according to the first embodiment of the present invention. On conditions shown in FIG. 5, a viewing angle dependency of a transmittance in the liquid crystal display device 14 is calculated in a case where a viewing angle is changed horizontally in the liquid crystal display device 14 shown in FIGS. 3A, 3B, 4A and 4B. FIG. 6 shows a result of the calculation. More specifically, FIG. 6 shows a simulation result of the viewing angle dependency of the transmittance in the liquid crystal display device 14 according to the first embodiment of the present invention. As shown in FIG. 6, an abscissa represents a viewing angle, and a positive side indicates that the observer observes the liquid crystal display device 14 from the right side of the liquid crystal display device 14. In FIG. 5, Δn·d represents a product of a birefringence Δn and a thickness d of the liquid crystal layer 9. As a value becomes larger, a transmittance can be obtained with a lower applied voltage. However, a voltage difference between display levels becomes narrow disadvantageously. Therefore, the transmittance is set within a range between 300 nm and 450 nm such that a voltage at white display falls within a range between 4 V and 5 V. For the calculation, simulation software (LCD Master, Symantec) is used. The liquid crystal tilt direction is set at 0° and 180°, that is, the liquid crystal tilt direction is set so as to tilt in the horizontal direction. Moreover, an area ratio between the domain 11a and the domain 11b is set at 1:1 in order to enhance a symmetry of an optical property upon change of the line of sight in the horizontal direction. As shown in FIG. 6, a level is set such that a lightness is divided into seven levels from white display (Level 8) to a level at a CR of 100 (a level in a case where a brightness is 1/100 of the white display, i.e., Level 1). Herein, Level 0 represents black display. With regard to the foregoing description, refer to J. Hirata, "Viewing-Angle Evaluation Method for LCDs with Gray-Scale Image", 1993 Society for Information Display International Symposium Digest of Technical Papers, Society for Information Display, 1993, pp. 561-564 (hereinafter, reference to as Document 1).

Next, determination is made whether or not tone reversal occurs due to the viewing angle, based on an index $Q(\Theta)$) obtained from the following equation (1).

Equation (1)

$$Q(\Theta) = \min_{(n,m)}\left[\min_{(i,j)}\left(\frac{T(V_n, \theta_i)}{T(V_m, \theta_i)} - 1\right)\left(\frac{T(V_n, \theta_j)}{T(V_m, \theta_j)} - 1\right)\right] \quad (1)$$

Herein, Vm and Vn represent applied voltages at two levels for evaluation of occurrence of the reversal, θi and θj represent two calculational continuous viewing angles (θj=θi+10° because the calculation is performed for each interval of 10° in the embodiments of the present invention), T(V, θ) represents a transmittance at a voltage of V and a viewing angle of θ, and Θ represents a maximum value of the viewing angle that recognizes the occurrence of the tone reversal. Moreover, min indicates that a minimum value is adopted by scanning of a set of (i, j) and a set of (m, n). It is assumed herein that a relation of Vn>Vm is satisfied.

The circularly polarizing MVA liquid crystal display device according to the embodiments of the present invention is of a normally black type. Therefore, if no tone reversal occurs in the case where the relation of Vn>Vm is established, relations of T(Vn, θi)>T(Vm, θi) and T(Vn, θj)>T(Vm, θj) are established, so that values in two parentheses in the equation (1) are positive values, respectively. Accordingly, if no tone reversal occurs in all the levels or all the viewing angles, a relation of $Q(\Theta)>0$ is established. In the case where the tone reversal occurs, when the viewing angle is increased gradually from the front side where no tone reversal occurs, a product of the values in the two parentheses in the equation (1) takes a negative value at the viewing angle at which the tone reversal occurs. In other words, a magnitude relation of the transmittance is inverted at the viewing angles θi and θj between which the viewing angle at which the tone reversal occurs exists. As a result, a relation of $Q(\Theta))<0$ is established.

As shown in FIG. 6, attention is given to the white display (Level 8 in which the viewing angle is 0° and the transmittance is maximal). The viewing direction is directed in the right direction from the viewing angle of 0°. Then, at a position where the viewing angle exceeds 40°, the transmittance at the lower level (for example, Level 7) becomes higher than the transmittance in the white display, so that the tone reversal occurs. At the viewing angle of 40° immediately before the occurrence of the tone reversal, a relation of $T(V_{Level\ 8}, 40°) > T(V_{Level\ 7}, 40°)$ is established. At the viewing angle of 50° immediately after the occurrence of the tone reversal, on the other hand, a relation of $T(V_{Level\ 8}, 50°) < T(V_{Level\ 7}, 50°)$ is established. Therefore, a relation of $(T(V_{Level\ 8}, 40°)/T(V_{Level\ 7}, 40°)-1)(T(V_{Level\ 8}, 50°)/T(V_{Level\ 7}, 50°)-1)<0$ is established. Accordingly, when a relation of Θ>50° is established, the index $Q(\Theta))$ takes a negative value without fail.

Figure 7:
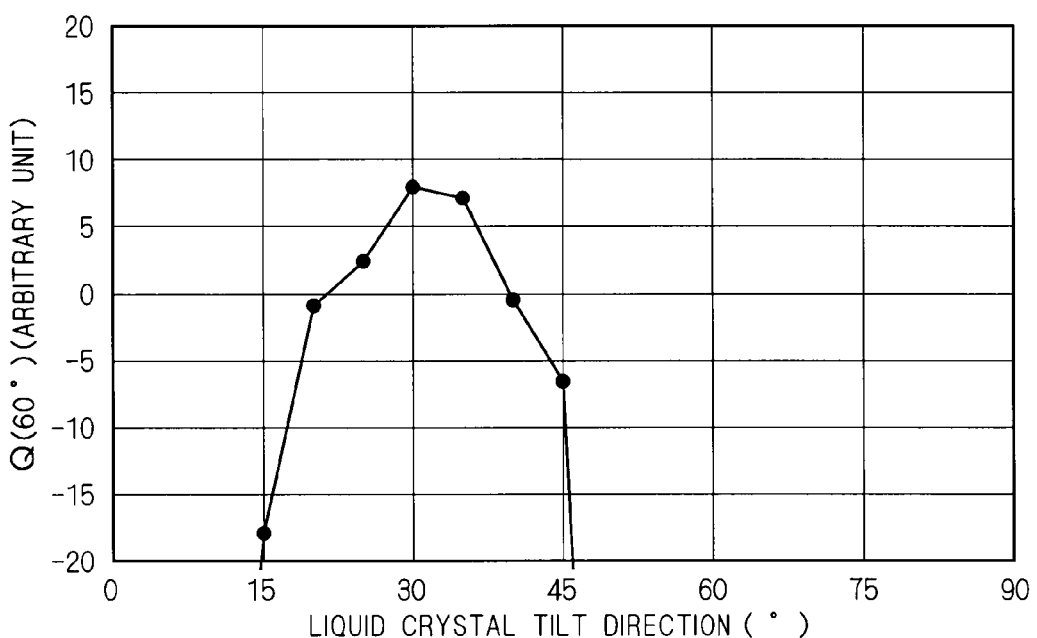
FIG. 7 shows a simulation result of an index Q(60°) in the liquid crystal display device according to the first embodiment of the present invention.
Figure 8:
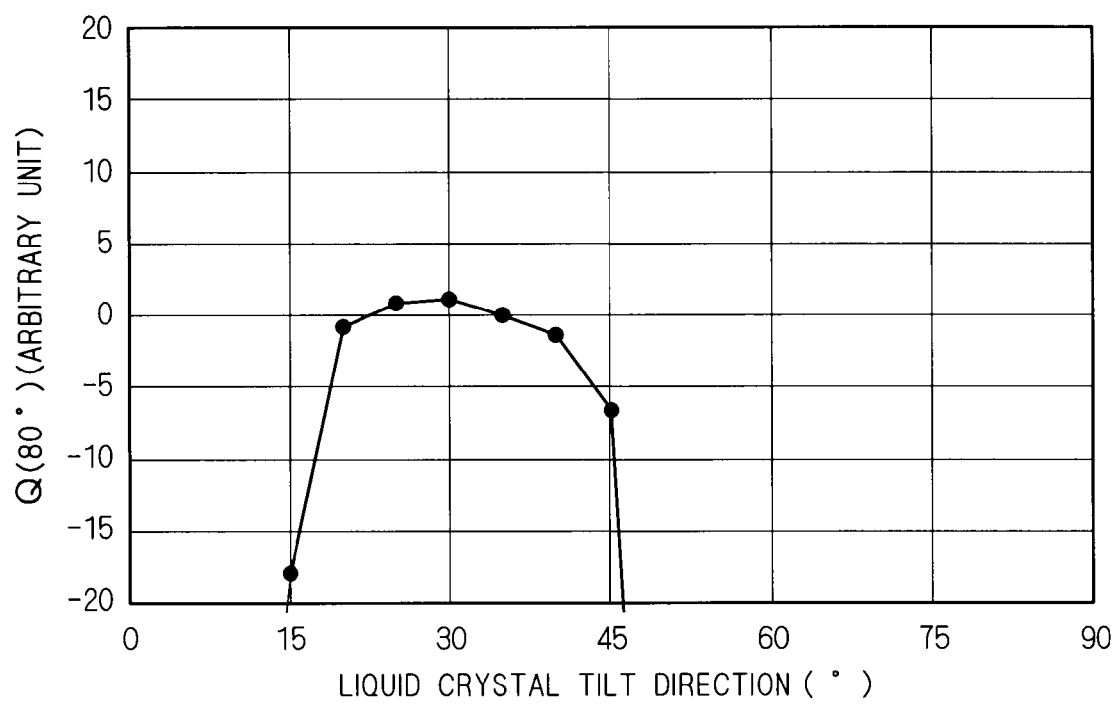
FIG. 8 shows a simulation result of an index Q(80°) in the liquid crystal display device according to the first embodiment of the present invention.

As described above, when the tone reversal occurs, the relation of $Q(\Theta))<0$ is established. FIG. 7 shows a simulation result of an index $Q(60°)$ in the liquid crystal display device 14 according to the first embodiment of the present invention. In FIG. 7, an abscissa represents the liquid crystal tilt direction in the domain 11a or the domain 11b, and the liquid crystal tilt direction is calculated for each interval of 5°. Parameters to be used for the calculation are equal to those shown in FIG. 5 except the liquid crystal tilt direction. Moreover, scaling is performed by multiplying an ordinate by an appropriate positive value such that the index $Q(60°)$ takes a one-digit numeric value or a two-digit numeric value. A range of the viewing angle at which a relation of $Q(60°)>0$ is established is obtained in such a manner that intermediate points in FIG. 7 are interpolated by a straight line. Thus, a range between 21.3° and 39.7° is obtained. Accordingly, the liquid crystal tilt direction in one of the domain 11a and the domain 11b which are different in liquid crystal tilt direction from each other by 180° is set within the range between 21.3° and 39.7°, so that no tone reversal occurs within the range of the viewing angle up to 60°. It is to be noted that a value of 10° or less and a value of 50° or more take a negative value, respectively, and an absolute value becomes larger considerably; therefore, these values are not shown in FIG. 7. FIG. 8 shows a simulation result of an index $Q(80°)$ in the liquid crystal display device 14 according to the first embodiment of the present invention. In FIG. 8, an abscissa represents the liquid crystal tilt direction in the domain 11a or the domain 11b, and the liquid crystal tilt direction is calculated for each interval of 5°. A range of the liquid crystal tilt direction in which a relation of $Q(80°)>0$ is established is between 22.5° and 34.8°. This range prevents the tone reversal from occurring in a range of a larger viewing angle. Therefore, this range is preferred rather than the range of the liquid crystal tilt direction in which the relation of $Q(60°)>0$ is established. As shown in FIGS. 7 and 8, most preferably, the maximum value of Q is 30°±4° because the liquid crystal tilt direction falls within a range less than 30°±5°.

In the circularly polarizing MVA liquid crystal display device, the transmittance obtained when the circularly polarizing MVA liquid crystal display device is seen from the front side thereof with respect to the liquid crystal tilt direction hardly varies if the applied voltage is single. Accordingly, the liquid crystal tilt direction is controlled such that the liquid crystal tilt direction falls within an appropriate range with the maximum transmittance which is almost equal to the transmittance in the while display (Level 8) being kept as it is. Thus, the circularly polarizing MVA liquid crystal display device can be used without occurrence of the tone reversal.

Figure 10:
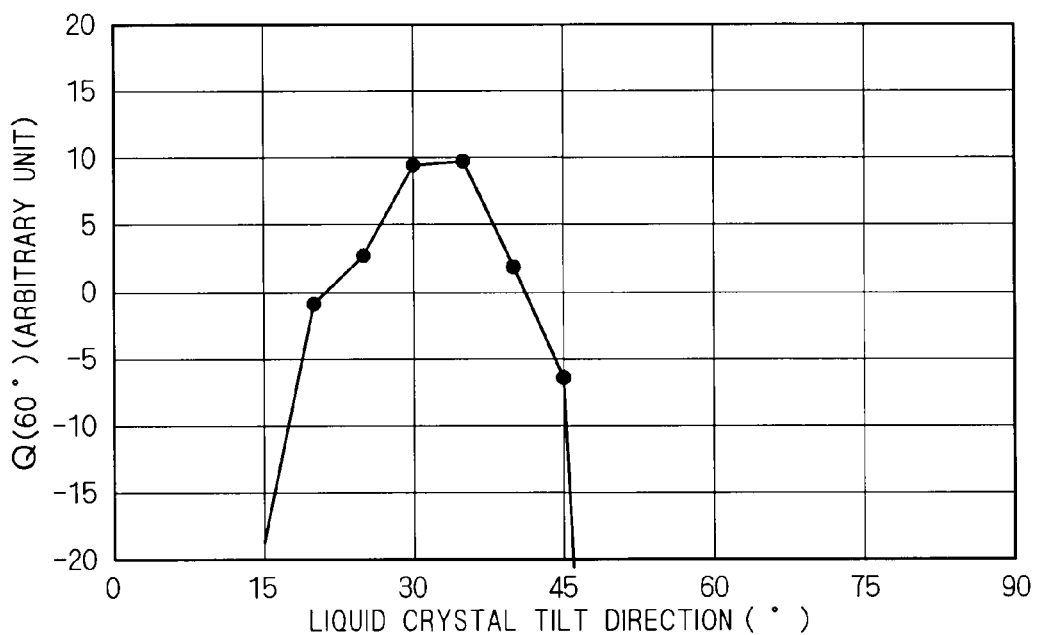
FIG. 10 shows a simulation result of an index Q(60°) in the liquid crystal display device according to the first embodiment of the present invention.
Figure 11:
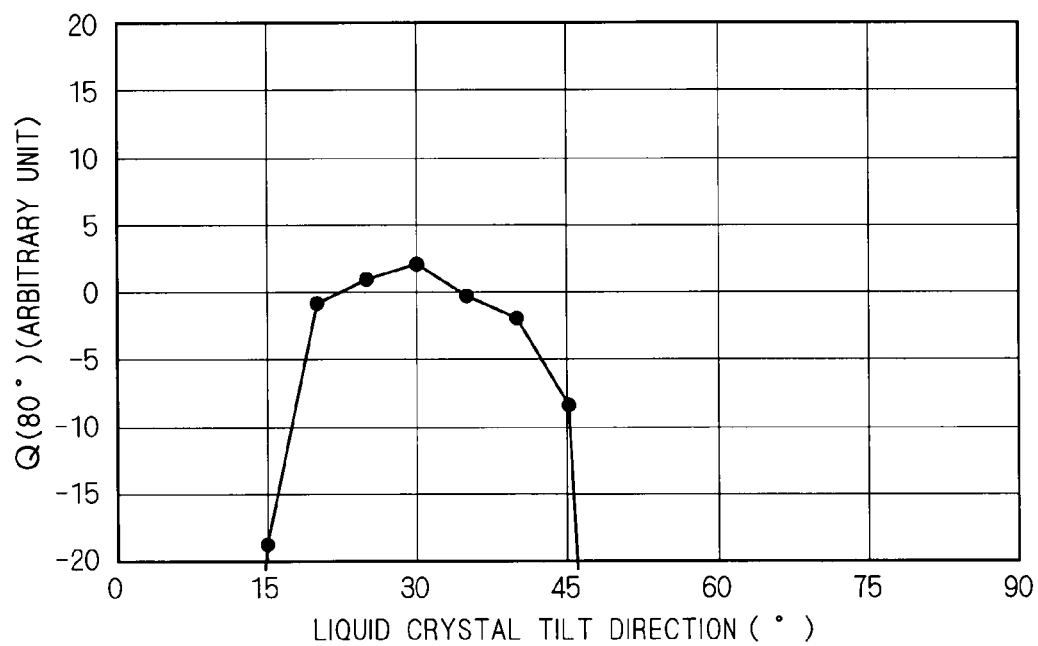
FIG. 11 shows a simulation result of an index Q(80°) in the liquid crystal display device according to the first embodiment of the present invention.

FIG. 10 shows a simulation result of an index Q(60°) in the liquid crystal display device according to the first embodiment of the present invention in a case of using the parameters shown in FIG. 9. FIG. 11 shows a simulation result of an index Q(80°) in the liquid crystal display device according to the first embodiment of the present invention in the case of using the parameters shown in FIG. 9. As shown in FIGS. 10 and 11, a range of the tilt direction in which a relation of Q(60°)>0 is established is between 21.2° and 41.1° while a range of the tilt direction in which a relation of Q(80°)>0 is established is between 22.3° and 34.4°. Accordingly, a maximum value of Q falls within a range where the liquid crystal tilt direction is less than 30°±5°. That is, it is understood that the range of the liquid crystal tilt direction does not affect details of the retardation plate and the polarizing plate so much.

The reason therefor is as follows. That is, it is required that the viewing angle in the horizontal direction is wide since importance is attached to the display property in the horizontal direction. Since the circularly polarizing MVA liquid crystal display device is of the normally black type, the liquid crystal does not tilt in the black display and is aligned vertically with respect to the substrate. Accordingly, each of the retardation plates 5 to 8 is set such that the transmittance decreases in the case where the liquid crystal layer 9 which is aligned vertically is seen in the horizontal direction. The optical property to be required is determined from only the parameter of Δn·d concerning the liquid crystal layer 9 irrespective of the specific settings of the retardation plates 5 to 8. In actual, the parameter of Δn·d falls within a narrow range between 300 nm and 450 nm in accordance with a maximum applied voltage (which decreases as Δn·d becomes larger, and electric power to be consumed decreases) and a response time (which becomes shorter as d becomes smaller). Hence, the range of the liquid crystal tilt direction does not affect the details of the retardation plate and the polarizing plate so much.

As described above, in the circularly polarizing MVA liquid crystal display device having the two domains, that is, the domain 11a and the domain 11b which are different in liquid crystal tilt direction from each other by 180°, the liquid crystal tilt direction in one of the two domains is set within a range between 22° and 39, preferably a range between 23° and 34°, more preferably a range of 30°±4° with respect to the x axis, irrespective of the details of the retardation plate and the polarizing plate, so that no tone reversal occurs even when the viewing angle is changed in the horizontal direction.

On the other hand, when the entire liquid crystal display device 14 is rotated by 90° about the z axis, the horizontal direction of the screen before the rotation is changed to the vertical direction of the screen after the rotation. Therefore, the liquid crystal tilt direction is set within a range between 51° and 68°, preferably a range between 56° and 67°, more preferably a range of 60°±4° with respect to the x axis, so that no tone reversal occurs even when the viewing angle is changed in the vertical direction.

In the liquid crystal display device 14 having the properties shown in FIG. 6, no tone reversal occurs if only the level which is Level 7 or less is used without use of Level 8; however, the maximum transmittance per opening area is degraded disadvantageously.

In the actual MVA liquid crystal display device, all the liquid crystals do not necessarily tilt in two directions. The tilt direction at a position near an apex of the bump is parallel with the formation direction of the bump. As described above, a domain which does not tilt in a desired direction is excluded from the opening by light shielding and the like; however, the area of the opening becomes smaller in comparison with a case where such a domain is included in the opening. Consequently, the maximum brightness of the liquid crystal display device is degraded disadvantageously unless the brightness of the backlight is enhanced. The case where the domain described above is included in the opening affects the portion which does not tilt in the desired direction. For this reason, preferably, the most preferable liquid crystal tilt direction is set in the actual MVA liquid crystal display device.

In the present invention, a minimum unit of the structures formed at regular intervals in order to apply a voltage to the liquid crystals and the domains driven by the structures is described as a pixel, and a minimum display unit for display of an image, which is configured by aggregation of one or more pixels is described as an image unit. It is assumed herein that one pixel has the domains 11a and 11b which are different in liquid crystal tilt direction from each other by 180°. In this case, even when only one pixel or only one image unit is lit, the resulting display becomes high in symmetry. In a case where the liquid crystal display device is small in size with high definition, a pixel to be formed is too small in size, resulting a possibility that the domains 11a and 11b can not be formed on one pixel. However, when the domain 11a and the domain 11b are formed on a pixel and a pixel adjoining thereto, respectively, almost symmetrical display is achieved in a case where display is performed by plural image units such as a natural image, which causes no problems.

Figure 12:
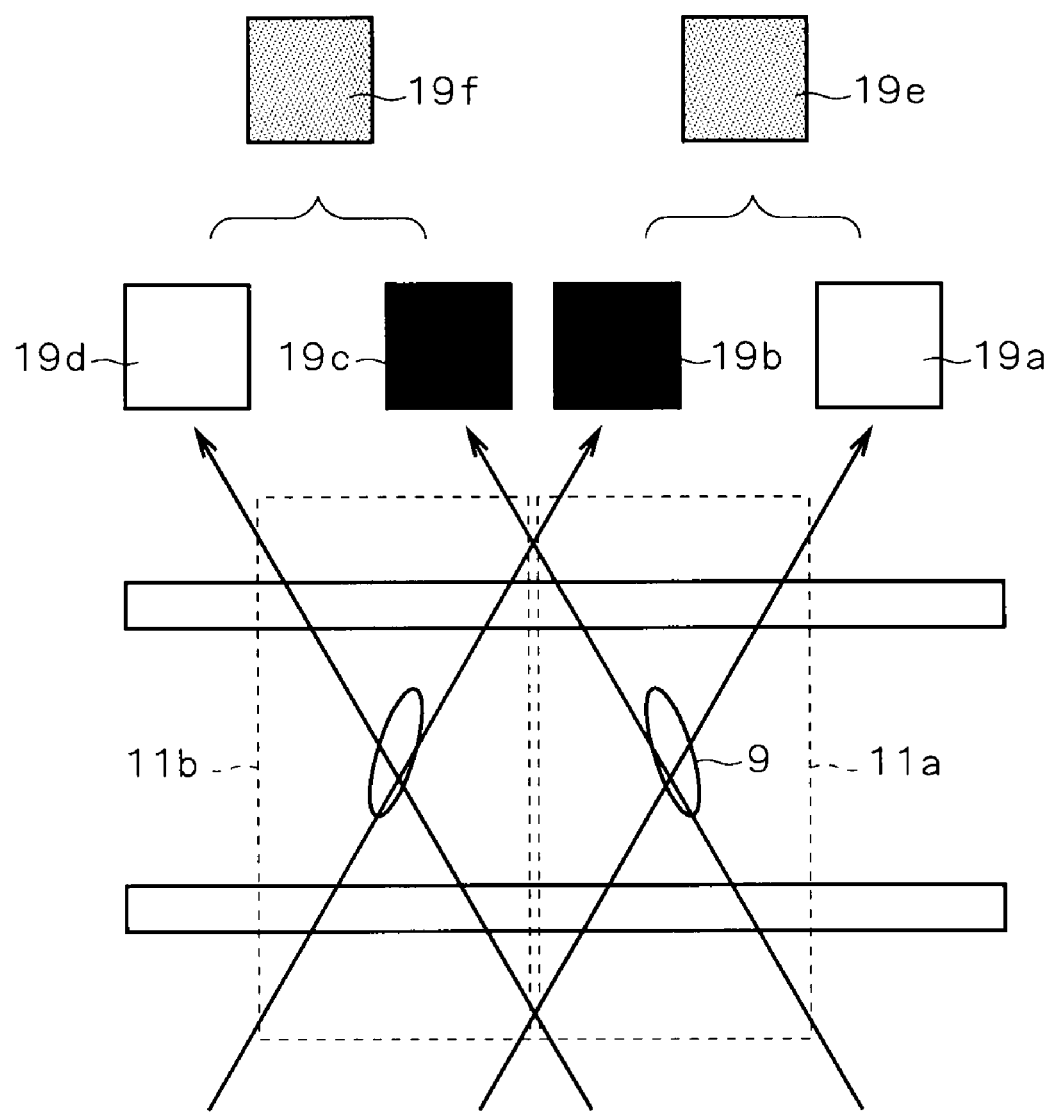
FIG. 12 shows a typical principle that an optical property becomes symmetrical by division into two domains which are different in liquid crystal tilt direction from each other by 180°.

An optical property in which a viewing angle is wide and a degree of a symmetry is high is required of the liquid crystal display device (refer to Patent Documents 1, 3 and 4). In particular, importance is attached to the symmetry in the horizontal direction and the vertical direction. FIG. 12 shows a concept frequently used in typical description indicating that the optical property becomes symmetric by division into two domains which are different in liquid crystal tilt direction from each other by 180°. As shown in FIG. 12, the division into the two domains which are different in liquid crystal tilt direction from each other by 180° is defined as a basic unit. Herein, an asymmetry between a transmittance 19c obtained when the domain 11a is seen obliquely along the liquid crystal tilt direction in the domain 11a and a transmittance 19a obtained when the domain 11a is seen from a direction which is different from the liquid crystal tilt direction by 180° is cancelled by an asymmetry between a transmittance 19b obtained when the domain 11b is seen obliquely along the liquid crystal tilt direction in the domain 11b and a transmittance 19d obtained when the domain 11b is seen from a direction which is different from the liquid crystal tilt direction by 180°, so that the light transmitting through the domain 11a and the light transmitting through the domain 11b are seen simultaneously. Herein, if the viewing angle in the domain 11a is equal to the viewing angle in the domain 11b, a transmittance 19f in the viewing direction along the liquid crystal tilt direction in the domain 11a is equal to a transmittance 19e in the viewing direction along the liquid crystal tilt direction in the domain 11b. Through use of this fact, an optical property which is high in symmetry is realized (refer to Patent Documents 1 and 2).

In order to improve the viewing angle of the liquid crystal display device, the technique of dividing the alignment of the liquid crystal based on the different domains has widely been adapted to TN liquid crystal display devices, and then has been applied to VA liquid crystal display devices (refer to Japanese Patent Application Laid-Open No. 10-301113 (hereinafter, referred to as Document 2)). In the TN liquid crystal display device, a display screen is black due to a low transmittance when being seen from a liquid crystal tilt direction. On the other hand, the display screen is white due to a high transmittance when being seen from an opposite direction to the liquid crystal tilt direction. Therefore, formation of two domains which are opposite in tilt direction to each other allows averaging of the transmittances even when the display screen is seen from the liquid crystal tilt direction (refer to Japanese Patent Application Laid-Open No. 08-129180 (hereinafter, referred to as Document 3)). Description about the MVA liquid crystal display device follows the description about the TN liquid crystal display device. In the TN liquid crystal display device, the viewing angle is narrow in the direction that the display screen is black (that is, a CR decreases at a small viewing angle). However, the division makes the display screen bright, so that the viewing angle becomes wider after the division. In many cases, therefore, a feature of enlargement in viewing angle is highlighted rather than a feature of improvement in symmetry.

The symmetry of the optical property in the horizontal direction and the symmetry of the optical property in the vertical direction are important in the liquid crystal display device. Generally, an MVA liquid crystal display device that divides a liquid crystal into four in four domains in which a liquid crystal tilt direction has a rotational symmetry of 90° which is higher in symmetry and an MVA liquid crystal display device in which a liquid crystal tilt direction is changed successively with a specific point being defined as a symmetrical center, that is, has axially symmetrical alignment which is higher in symmetry are preferable rather than an MVA liquid crystal display device that divides a liquid crystal into two in two domains in which a liquid crystal tilt direction has a rotational symmetry of 180° about a z axis. As an example of the MVA liquid crystal display device that divides a liquid crystal layer into two in the two domains, there is disclosed a technique of controlling a liquid crystal tilt direction in a horizontal direction or a vertical direction in order to satisfy a requirement of a display symmetry or tilting the liquid crystal in a direction of 45° and a direction of 225° (or a direction of 135° and a direction of 315°) in order to achieve a symmetry in the horizontal direction and the vertical direction (refer to Patent Document 1). Moreover, as an example of the MVA liquid crystal display device that divides a liquid crystal layer into four in the four domains, there is disclosed a technique of controlling a liquid crystal tilt direction in a direction of 45°, a direction of 135°, a direction of 225° and a direction of 315°, respectively (refer to Patent Document 1, Patent Document 2 and Japanese Patent Application Laid-Open No. 2005-195753 (hereinafter, referred to as Document 4)). In the present invention, on the other hand, the liquid crystal tilt direction is displaced from the disclosed directions such as the horizontal direction, the vertical direction and the direction of 45°.

In a linearly polarizing MVA liquid crystal display device, no light leaks even when a line of sight is tilted in an absorption axis direction of a polarizing plate in black display; therefore, a viewing angle in the absorption axis direction is wide. Accordingly, an absorption axis of a first polarizing plate is directed in a horizontal direction while an absorption axis of a second polarizing plate is direction in a vertical direction in general. In a circularly polarizing MVA liquid crystal display device, however, a direction of widening a viewing angle does not match with a direction of an absorption axis of a polarizing plate and, therefore, is directed in a horizontal direction and a vertical direction by adjustment of the absorption axis direction of the polarizing plate and a slow axis direction of a retardation plate (refer to Patent Document 2 and Document 4). In order to direct the direction of widening the viewing angle in the horizontal direction and the vertical direction, preferably, the tilt directions of the polarizing plate, retardation plate and liquid crystal are rotated about the z axis; however, such countermeasures have not been reported. The reason therefor is as follows. That is, since the liquid crystal tilt direction is displaced from the horizontal direction, the vertical direction and the direction of 45°, a user feels as if the symmetry of the liquid crystal tilt direction is degraded with respect to the horizontal direction and the vertical direction.

Herein, the symmetry of the liquid crystal tilt direction and the symmetry of the optical property will be studied in detail. FIGS. 13A and 13B show a fact that the optical property becomes symmetric by the division into the two domains which are different in liquid crystal tilt direction from each other by 180° in the embodiments of the present invention. Herein, the tilt angle of the liquid crystal in the domain $11a$ is defined as $\theta$ while the tilt direction of the liquid crystal in the domain $11a$ is defined as $\phi$. As shown in FIG. 13A, in a case where an applied voltage in the domain $11a$ is equal to that in the domain $11b$, the tilt angle of the liquid crystal in the domain $11b$ becomes $\theta$ which is equal to that in the domain $11a$, and the tilt direction of the liquid crystal in the domain $11b$ becomes $\phi+180°$. When an area ratio between the domain $11a$ and the domain $11b$ is 1:1, an alignment state of the liquid crystal has a rotational symmetry of 180° about an axis parallel with the z axis passing through a center between the domain $11a$ and the domain $11b$. Accurately, a shape of each of the domains $11a$ and $11b$ must satisfy the rotational symmetry of 180°. However, it is assumed herein a case where the measuring instrument 17 is disposed sufficiently far away from the liquid crystal display device and can not spatially distinguish the domain $11a$ from the domain $11b$, which is a basic principle of alignment division and color display using a color filter; therefore, particular discussion about the shape will not be given here. In FIGS. 13A and 13B, the measuring instrument 17 is disposed near the liquid crystal display device for convenience.

As shown in FIG. 13B, next, when the viewing direction is rotated by 180° with the viewing angle being fixed, each of the tilt angle of the liquid crystal in the domain $11a$ and the tilt angle of the liquid crystal in the domain $11b$ stays $\theta$. However, the tilt direction of the liquid crystal in the domain $11a$ becomes $\phi+180°$ while the tilt direction of the liquid crystal in the domain $11b$ becomes $\phi+180°+180°=\phi$, so that the alignment state of the liquid crystal in the domain $11a$ and the alignment state of the liquid crystal in the domain $11b$ are inverted. Each of the polarizing plate and the retardation plate has a rotational symmetry of 180° about an axis parallel with the z axis, and the viewing angle has no change. Therefore, a difference between the state before the rotation of the viewing direction and the state after the rotation of the viewing direction is only that the alignment state of the liquid crystal and the optical property in the domain $11a$ and the alignment state of the liquid crystal and the optical property in the domain $11b$ are inverted. In the case where the observer attempts to see the light transmitting through the domain $11a$ and the light transmitting through the domain $11b$ simultaneously, the observer can recognize only a sum of the light transmitting through the domain 11a and the light transmitting through the domain 11b. Therefore, the observer feels as if the optical property before the rotation is completely equal to the optical property after the rotation. Accordingly, when the alignment state of the liquid crystal has the rotational symmetry of 180° about the x axis, the horizontal direction becomes symmetrical. Moreover, the vertical direction also becomes symmetrical for the same reason. More typically, the foregoing consideration is established irrespective of the value of ϕ; therefore, the viewing directions which are different from each other by 180° become symmetrical. This fact does not depend on the details of the relation between the viewing direction of the observer and the liquid crystal tilt direction. Insufficient understanding about the fact described above causes misrecognition that the optical property does not become symmetrical in the direction orthogonal to the liquid crystal tilt direction as described in Patent Document 1.

As described above, it is understood that interpretation about the description that the optical property with high symmetry can be realized by the alignment of the liquid crystal with high symmetry in various documents requires caution. If this description is interpreted literally, the liquid crystal is provided vertically with respect to the substrate plane in the black display in the MVA liquid crystal display device, the alignment state with considerably high symmetry is realized exactly. Therefore, it can be considered that the transmittance in the black display has a considerably high symmetry. In actual, however, when the MVA liquid crystal display device is seen in the black display in such a manner that the viewing angle is fixed while the viewing direction is changed, a black screen and a slightly bright screen are displayed alternately at an interval of 90°. That is, the transmittance in the black display has a rotational symmetry of 90° and the CR varies at the interval of 90° (refer to Japanese Patent Application Laid-Open No. 2005-257809 (hereinafter, referred to as Document 5) (FIG. 9)). The reason therefor is that each of the system of the polarizing plate and the system of the retardation plate has the rotational symmetry of 90°. Each of the polarizing plate and the retardation plate has the rotational symmetry of 180°. In the circularly polarizing MVA liquid crystal display device, however, the transmission axes of the polarizing plates are orthogonal to each other, the slow axes of the retardation plates are orthogonal to each other, and retardation of the polarizing plate is equal to the retardation of the retardation plate. Therefore, the circularly polarizing MVA liquid crystal display device has the rotational symmetry of 90°. Accordingly, the optical property of the circularly polarizing MVA liquid crystal display device only has the rotational symmetry of 90° at most. The optical property with high symmetry can be realized by the liquid crystal alignment with high symmetry up to the rotational symmetry of 90°. Even when the optical property has the symmetry exceeding the rotational symmetry of 90°, the symmetry of the optical property does not become the rotational symmetry of 90° or more.

Inadvertent extrapolation of a fact that the state of the rotational symmetry of 90° or less which is low in symmetry is changed to the state of the rotational symmetry of 90° or more which is high in symmetry leads to an erroneous conclusion that the optical property is high in symmetry because the liquid crystal alignment is high in symmetry. The liquid crystal of the axially symmetrical alignment gives an impression that "it looks like the same when being seen from all directions". This impression is correct if only the liquid crystal layer is seen in actual, which causes a factor of encouragement of the inadvertent extrapolation described above. With regard to the MVA liquid crystal display device adopting the axially symmetrical alignment, Document 1 describes that "FIG. 9 shows a result of properties of a viewing angle and a contrast in the transmittance display . . . . The viewing angle property in the transmission display exhibits a property which is symmetrical in substantially all directions . . . ." FIG. 9 in Document 1 does not show the symmetry in substantially all directions, but explicitly shows a rotational symmetry of substantially 90°.

In the circularly polarizing MVA liquid crystal display device adopting the axially symmetrical alignment, the transmittance in the white display exhibits the viewing direction dependency which is close to the viewing direction dependency in all directions. However, this matter is applied to only the white display. All the optical properties of the circularly polarizing MVA liquid crystal display device adopting the axially symmetrical alignment do not always exhibit the viewing direction dependency in all directions.

As described above, it is difficult to make discussion about the symmetry of the optical property unless sufficient consideration is given to the symmetry of the entire system, that is, the tilt directions of the polarizing plate, retardation plate and liquid crystal. It is difficult to determine that the viewpoint of the conclusion resulting from the accurate and general consideration about the symmetry of the liquid crystal tilt direction and the symmetry of the optical property is widely recognized in general.

In view of the foregoing description, attention is given to the fact that the liquid crystal tilt direction can be changed while the symmetry of the optical property in the horizontal direction is maintained, in the present invention. That is, the high transmittance and the tone reversal in the horizontal direction are suppressed by quantitatively obtaining a range of the liquid crystal tilt direction where no tone reversal occurs in the horizontal direction through use of the index Q.

Figure 14A:
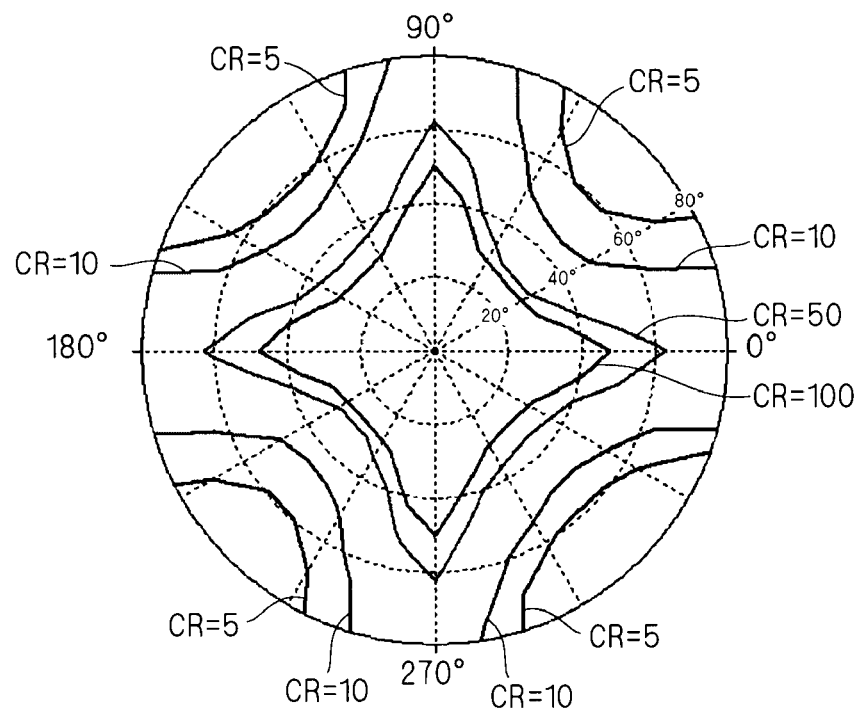
FIG. 14A shows a simulation result of a viewing angle and a viewing direction which are equal in CR to each other in the parameters shown in FIG. 5 in the first embodiment of the present invention.
Figure 14B:
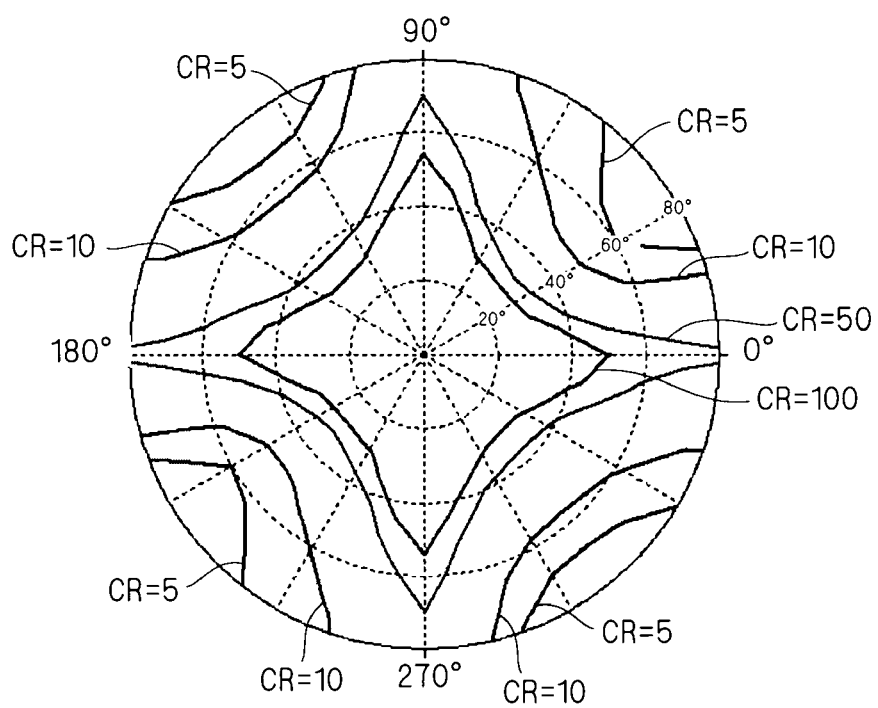
FIG. 14B shows a simulation result of the viewing angle and the viewing direction which are equal in CR to each other in the parameters shown in FIG. 9 in the first embodiment of the present invention.

FIG. 14A shows a simulation result of the viewing direction and the viewing angle which are equal in CR to each other in parameters shown in FIG. 5 in the first embodiment of the present invention, and FIG. 14B shows a simulation result of the viewing direction and the viewing angle which are equal in CR to each other in the parameters shown in FIG. 9 in the first embodiment of the present invention. In FIGS. 14A and 14B, the liquid crystal tilt direction is 30° in the domain 11a. When a point in a circle is represented by a polar coordinate (r, ϕ), a radius vector r is proportional to the viewing angle. When the radius vector r is equal to zero, the viewing angle becomes 0°. A maximum value of the radius vector r corresponds to the viewing angle of 80°. Moreover, an azimuth angle ϕ corresponds to the viewing direction. When the azimuth angle ϕ is equal to 0°, the viewing direction is the right direction (the right direction in the figure). As shown in FIGS. 14A and 14B, points designated by the viewing angle and the viewing direction which are equal in CR to each other are connected by a line. The liquid crystal tilt direction is displaced by 30° from the horizontal direction. However, the viewing angle property is symmetrical in the horizontal direction and, also, is symmetrical in the vertical direction.

The horizontal direction is invariable with respect to the rotation of 180° about the x axis. As shown in FIGS. 5 and 9, therefore, even when the polarizing plate, the retardation plate and the liquid crystal layer in the circularly polarizing MVA liquid crystal display device where no tone reversal occurs in the horizontal direction are reversed, no tone reversal occurs in the horizontal direction. When the liquid crystal layer is rotated by 180° about the x axis, the sign of the liquid crystal tilt direction is inverted. That is, if the liquid crystal tilt direction in one of the domain 11a and the domain 11b which are different in liquid crystal tilt direction from each other by 180° falls within a range between −22° and −39°, preferably a range between −23° to −34°, more preferably a range of −30°±4°, no tone reversal occurs in the horizontal direction. The optical property is inverted in the vertical direction. In the circularly polarizing MVA liquid crystal display device having the divided two domains which are different in liquid crystal tilt direction from each other by 180°, however, the optical property is symmetrical in the viewing directions which are different from each other by 180°. In the circularly polarizing MVA liquid crystal display device where no tone reversal occurs originally in the vertical direction, therefore, no tone reversal occurs in the vertical direction even when the constituent components are reversed as described above. That is, when the liquid crystal tilt direction is set within a range between −51° and −68°, preferably a range between −56° and −67°, more preferably a range of −60°±4° with respect to the x axis, no tone reversal occurs in the vertical direction.

As described above, the liquid crystal tilt direction can be controlled by the control structure such as the bump or the slit. Basically, the liquid crystal tilt direction is controlled such that the liquid crystal in the domain interposed between the control structures in the control structure extension direction tilts in the direction orthogonal to the control structure extension direction of the control structure (in this specification, even in a case where the respective control structures are provided on separate substrate, if the control structures are seen as if the control structures adjoin to each other from the front side, the control structures are defined as adjoining control structures.) As described in Patent Document 2, however, the liquid crystal tilt direction can be controlled in the direction parallel with the control structure extension direction in such a manner that a gap between the control structures is made narrower. In any cases, desirably, the liquid crystal tilt direction is evenly controlled in a wider domain of the opening. In order to achieve the control, preferably, the oblique surface extension direction of the control structure is made longer as much as possible. However, the angle formed by the oblique surface extension direction of the control structure and the x axis is set within the range described above. As described in Patent Document 2, moreover, in a case where the control structure extension direction of the control structure in the target domain is not parallel with the control structure extension direction of the control structure in the domain adjoining to the target domain when being seen from the front side, the liquid crystal in the target domain tilts in a direction orthogonal to an average of the angle formed by the control structure extension direction of the control structure in the adjoining domain and the x axis (in the case where the liquid crystal tilt direction is controlled in the direction orthogonal to the control structure extension direction) or tilts in a direction parallel with the average of the angle formed by the control structure extension direction of the control structure in the adjoining domain and the x axis (in the case where the liquid crystal tilt direction is controlled in the direction parallel with the control structure extension direction). Therefore, in the case where the control structure extension direction of the control structure in the target domain is not parallel with the control structure extension direction of the control structure in the domain adjoining to the target domain when being seen from the front side, preferably, the average of the angle formed by the control structure extension direction of the structure in the target domain and the x axis falls within the range described above.

In the circularly polarizing MVA liquid crystal display device having the divided two domains which are different in liquid crystal tilt direction from each other by 180°, as described above, the liquid crystal tilt direction in one of the domains is set within the range between 22° and 39°, preferably the range between 23° and 34°, more preferably the range of 30°±4° with respect to the x axis, so that no tone reversal occurs in the horizontal direction of the liquid crystal display device. Further, the liquid crystal tilt direction is set within the range between 51° and 68°, preferably the range between 56° and 67°, more preferably the range of 60°±4° with respect to the x axis, so that no tone reversal occurs in the vertical direction of the liquid crystal display device.

Second Embodiment

In the description of the first embodiment, the circularly polarizing MVA liquid crystal display device has the divided two domains which are different in liquid crystal tilt direction from each other by 180°. In the second embodiment, on the other hand, description will be given of a circularly polarizing MVA liquid crystal display device having divided four domains which are different in liquid crystal tilt direction from one another. Herein, a polarizing plate and a retardation plate are similar to those described in the first embodiment.

FIG. 15 schematically shows the liquid crystal display device according to the second embodiment of the present invention in a case where the liquid crystal display device is seen from a front side thereof. As shown in FIG. 15, electrodes 10 applying voltages to liquid crystals are provided at regular intervals at a liquid crystal side of a substrate 1. Plural structures shown in FIG. 15 are provided at regular intervals throughout a display screen. In FIG. 15, an electrode 13 provided at a liquid crystal side of a substrate 2 is formed into a rectangular shape to cover the entire display screen. Moreover, an auxiliary capacitor electrode, a switching element, a wire and the like are not shown in FIG. 15.

As shown in FIG. 15, a domain 11A and a domain 11B are different from each other in terms of a tilt direction of a liquid crystal upon application of a voltage to the liquid crystal by almost 180°, a domain 11C is different from the domain 11A in terms of the tilt direction of the liquid crystal upon application of the voltage to the liquid crystal, and a domain 11D is different from the domain 11C in terms of the tilt direction of the liquid crystal upon application of the voltage to the liquid crystal by almost 180°. When an angle formed by the tilt direction of the liquid crystal in the domain 11A and a positive direction of an x axis is defined as $\phi$, an angle formed by the tilt direction of the liquid crystal in the domain 11C and the positive direction of the x axis is 180°−$\phi$. Moreover, the tilt direction of the liquid crystal in the domain 11B is 180°$\phi$=−180°+$\phi$, and the tilt direction of the liquid crystal in the domain 11D is 180°+180°−$\phi$=−$\phi$. In FIG. 15, a resin bump 12 is used as a structure for controlling the liquid crystal tilt direction; however, the present invention is not limited thereto as long as the liquid crystal tilt direction can be controlled like a slit 19. Upon formation of the resin bump 12 or the slit 19 on the substrate 1 and the substrate 2, the resin bump 12 and the slit 19 may be formed in combination. Although not shown in the FIG. 15, an opening on the display screen is formed such that overlaps with the domains 11A, 11B, 11C and 11D are almost equal in area to one another when being seen from the front side.

In the second embodiment of the present invention, the circularly polarizing MVA liquid crystal display device has the divided four domains (11A, 11B, 11C, 11D) which are different in liquid crystal tilt direction from one another. Herein, when the angle formed by the liquid crystal tilt direction in the domain 11A and the positive direction of the x axis is defined as $\phi$, the angle formed by the liquid crystal tilt angle in the domain 11C and the positive direction of the x axis is 180°−φ, wherein φ falls within a range between 26° and 42° or a range between 48° and 64°. Hereinafter, description will be given of reasons why the liquid crystal tilt direction should be set within the angular range described above.

Figure 16:
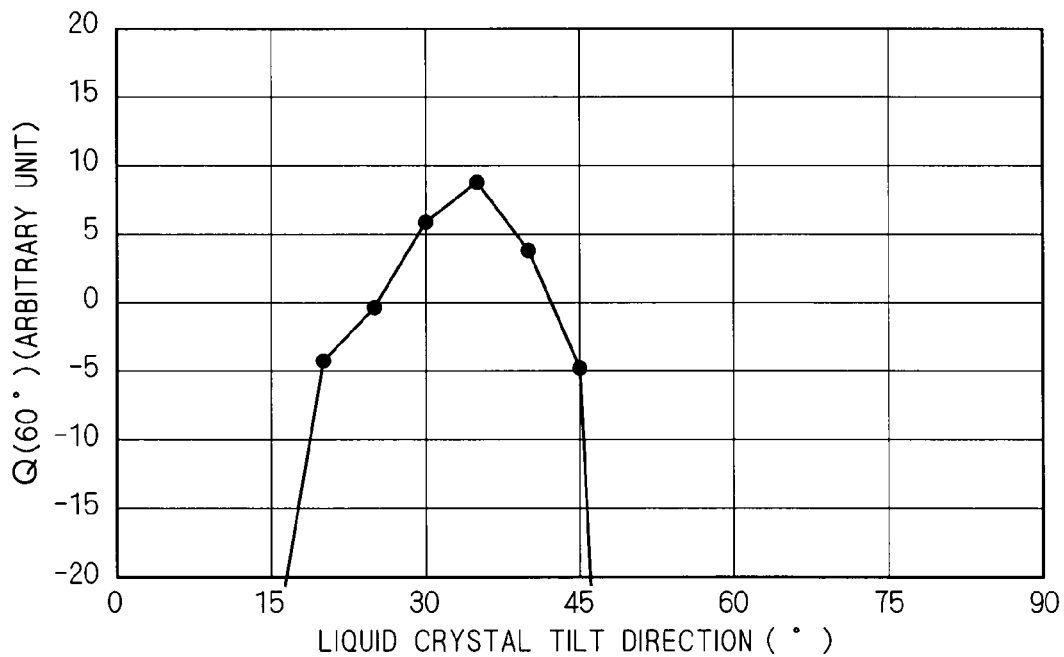
FIGS. 16 and 17 show a simulation result of an index Q(60°) in the liquid crystal display device according to the second embodiment of the present invention.

FIG. 16 shows a simulation result of an index Q(60°) in the liquid crystal display device according to the second embodiment of the present invention. Herein, the parameters shown in FIG. 5 are used except the liquid crystal tilt direction. As shown in FIG. 16, an abscissa represents the liquid crystal tilt direction φ in the domain 11A, and the liquid crystal tilt direction φ is calculated for each interval of 5°. It is assumed herein that the domains 11A, 11B, 11C and 11D are equal in area to one another. Moreover, scaling is performed by multiplying an ordinate by an appropriate positive value such that the index Q(60°) takes a one-digit numeric value or a two-digit numeric value. A range of the liquid crystal tilt direction in which a relation of Q(60°)>0 is established is obtained in such a manner that points obtained by calculation are interpolated by a straight line. Thus, a range between 25.3° and 42.4° is obtained.

Figure 17:
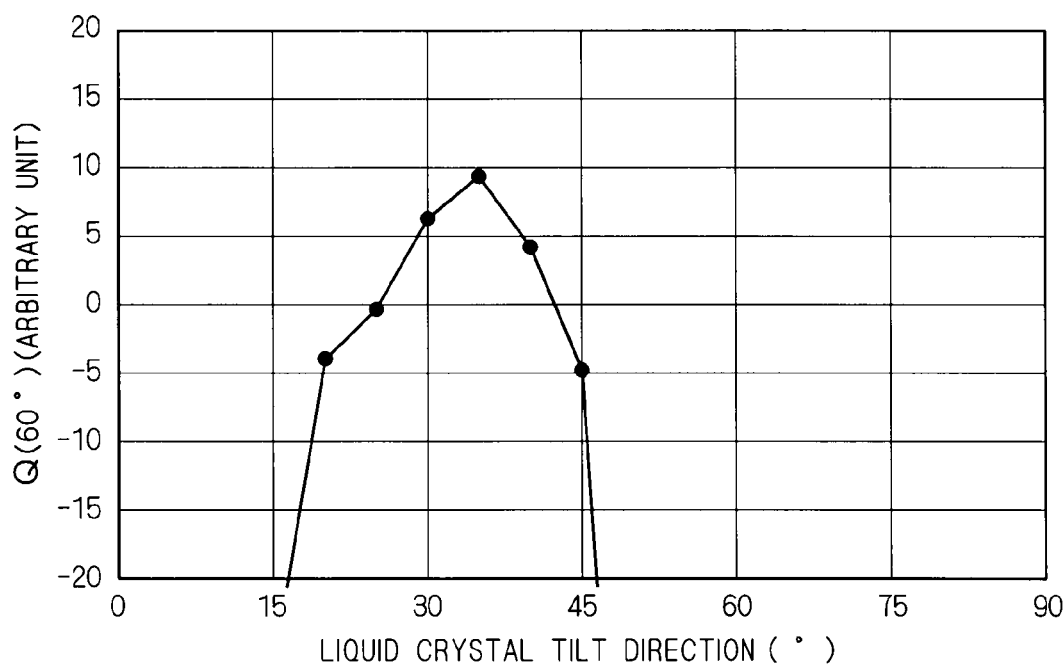

FIG. 17 shows a simulation result of an index Q(60°) in the liquid crystal display device according to the second embodiment of the present invention. Herein, the parameters shown in FIG. 9 are used except the liquid crystal tilt direction. As shown in FIG. 17, an abscissa represents the liquid crystal tilt direction φ in the domain 11A, and the liquid crystal tilt direction φ is calculated for each interval of 5°. It is assumed herein that the domains 11A, 11B, 11C and 11D are equal in area to one another. Moreover, scaling is performed by multiplying an ordinate by an appropriate numeric value such that the index Q(60°) takes a one-digit positive value or a two-digit positive value. A range of the liquid crystal tilt direction in which the relation of Q(60°)>0 is established is obtained in such a manner that points obtained by calculation are interpolated by a straight line. Thus, a range between 25.2° and 42.4° is obtained.

Accordingly, in the circularly polarizing MVA liquid crystal display device in which the domain 11A and the domain 11B are different from each other in terms of the tilt direction of the liquid crystal upon application of the voltage to the liquid crystal by almost 180°, the domain 11C is different from the domain 11A in terms of the tilt direction of the liquid crystal upon application of the voltage to the liquid crystal, the domain 11D is different from the domain 11C in terms of the tilt direction of the liquid crystal upon application of the voltage to the liquid crystal by almost 180°, and the angle formed by the liquid crystal tilt direction in the domain 11C and the positive direction of the x axis in the case where the angle formed by the liquid crystal tilt direction in the domain 11A and the positive direction of the x axis is defined as φ is 180°−φ, the liquid crystal tilt direction in the domain 11A is set within the range between 26° and 42°, so that no tone reversal occurs in a range of a viewing angle up to 60° in a horizontal direction.

Figure 18:
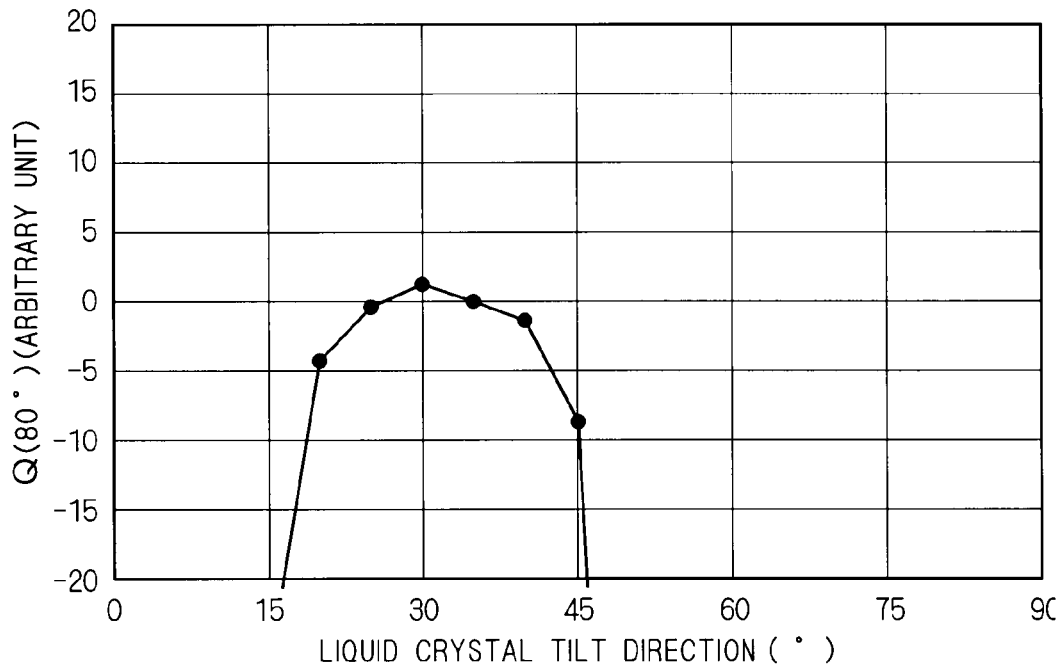
FIGS. 18 and 19 show a simulation result of an index Q(80°) in the liquid crystal display device according to the second embodiment of the present invention.

FIG. 18 shows a simulation result of an index Q(80°) in the liquid crystal display device according to the second embodiment of the present invention. Herein, the parameters shown in FIG. 5 are used except the liquid crystal tilt direction. As shown in FIG. 18, an abscissa represents the liquid crystal tilt direction φ in the domain 11A, and the liquid crystal tilt direction φ is calculated for each interval of 5°. It is assumed herein that the domains 11A, 11B, 11C and 11D are equal in area to one another. Moreover, scaling is performed by multiplying an ordinate by an appropriate positive value such that the index Q(80°) takes a one-digit numeric value or a two-digit numeric value. A range of the liquid crystal tilt direction in which a relation of Q(80°)>0 is established is obtained in such a manner that points obtained by calculation are interpolated by a straight line. Thus, a range between 26.2° and 34.9° is obtained.

Figure 19:
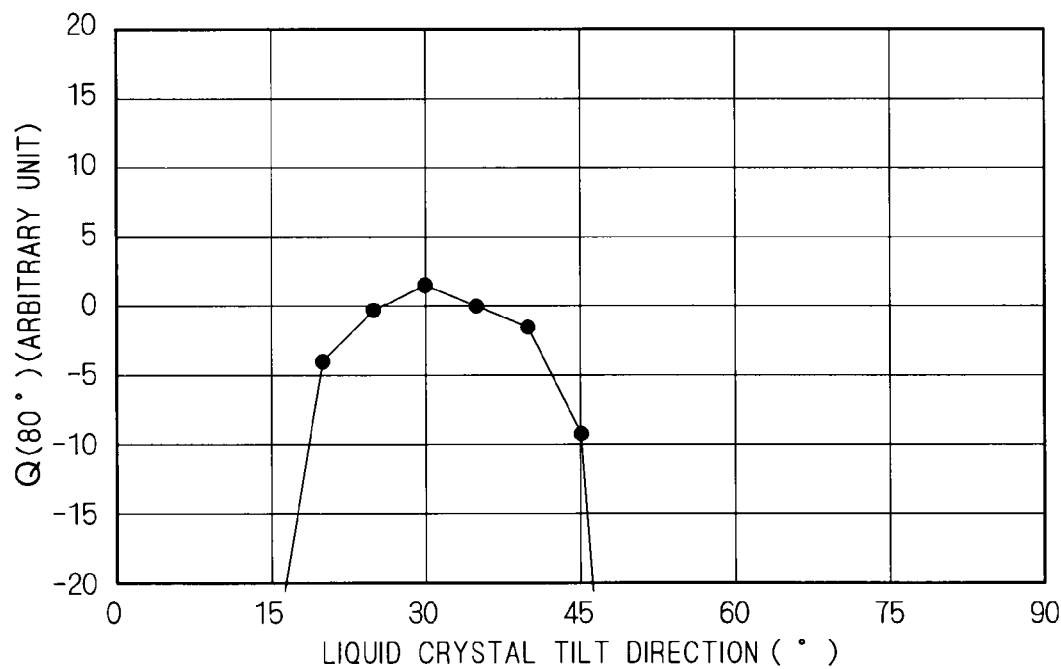

FIG. 19 shows a simulation result of an index Q(80°) in the liquid crystal display device according to the second embodiment of the present invention. Herein, the parameters shown in FIG. 9 are used except the liquid crystal tilt direction. As shown in FIG. 19, an abscissa represents the liquid crystal tilt direction φ in the domain 11A, and the liquid crystal tilt direction φ is calculated for each interval of 5°. It is assumed herein that the domains 11A, 11B, 11C and 11D are equal in area to one another. Moreover, scaling is performed by multiplying an ordinate by an appropriate positive value such that the index Q(80°) takes a one-digit numeric value or a two-digit numeric value. A range of the liquid crystal tilt direction in which the relation of Q(80°)>0 is established is obtained in such a manner that points obtained by calculation are interpolated by a straight line. Thus, a range between 25.9° and 35.0° is obtained.

Accordingly, in the circularly polarizing MVA liquid crystal display device in which the domain 11A and the domain 11B are different from each other in terms of the tilt direction of the liquid crystal upon application of the voltage to the liquid crystal by almost 180°, the domain 11C is different from the domain 11A in terms of the tilt direction of the liquid crystal upon application of the voltage to the liquid crystal, the domain 11D is different from the domain 11C in terms of the tilt direction of the liquid crystal upon application of the voltage to the liquid crystal by almost 180°, and the angle formed by the liquid crystal tilt direction in the domain 11C and the positive direction of the x axis in the case where the angle formed by the liquid crystal tilt direction in the domain 11A and the positive direction of the x axis is defined as φ is 180°−φ, the liquid crystal tilt direction in the domain 11A is set within the range between 27° and 34°, so that no tone reversal occurs in a range of the viewing angle up to 80° in the horizontal direction.

FIG. 20 shows a simulation result of a viewing angle dependency of a transmittance in the liquid crystal display device according to the second embodiment of the present invention. The parameters shown in FIG. 5 are used for calculation. The liquid crystal tilt direction in the domain 11A is set at 45°. This value is equal to that of a conventional typical liquid crystal tilt angle and, as shown in FIG. 20, the tone reversal occurs. In the second embodiment of the present invention, on the other hand, the tone reversal can be resolved and the transmittance can be made high in such a manner that the liquid crystal tilt direction is appropriately set as shown in FIGS. 16 to 19.

On the other hand, when the entire liquid crystal display device 14 is rotated by 90° about a z axis, a horizontal direction before the rotation is changed to a vertical direction after the rotation. Thus, the liquid crystal tilt direction in the domain 11A is set within a range between 48° and 64°, preferably a range between 56° and 63° with respect to the x axis, so that no tone reversal occurs even when a viewing angle is changed in the vertical direction.

If only a level which is Level 7 or less is used without using Level 8 in the liquid crystal display device having the properties shown in FIG. 20, occurrence of the tone reversal can be suppressed. However, a maximum transmittance per area of the opening is degraded as described above.

In the actual MVA liquid crystal display device, all the liquid crystals do not tilt in a target direction, and a tilt direction at a position near an apex of a bump is parallel with a formation direction of the bump. As described above, a domain which does not tilt in a desired direction may be excluded from the opening by light shielding or the like; however, the area of the opening becomes small as compared with a case where such a domain is included in the opening. Consequently, a maximum brightness of the liquid crystal display device is degraded unless a brightness of a backlight unit is enhanced. In the case where such a domain is included in the opening, the domain which does not tilt in the desired direction affects the opening. In order to avoid such a disadvantage, preferably, a most preferable liquid crystal tilt direction is set in the actual MVA liquid crystal display device.

In the circularly polarizing MVA liquid crystal display device in which the divided four domains (11A, 11B, 11C, 11D) are different in liquid crystal tilt direction from one another and the angle formed by the liquid crystal tilt direction in the domain 11C and the positive direction of the x axis in the case where the angle formed by the liquid crystal tilt direction in the domain 11A and the positive direction of the x axis is defined as $\phi$ is $180°-\phi$, if the four domains (11A, 11B, 11C, 11D) are included in one pixel, display with high symmetry can be realized even when only one pixel or only one image unit is lit. In a case where the liquid crystal display device is small in size with high definition, a pixel to be formed is too small in size, resulting a possibility that the four domains (11A, 11B, 11C, 11D) can not be formed in one pixel. However, when the four domains (11A, 11B, 11C, 11D) are formed in pixels adjoining to one another, respectively, almost symmetrical display is achieved in a case where display is performed by plural image units such as a natural image, which causes no problems. In a case where a lighting ratio among the four domains (11A, 11B, 11C, 11D) becomes unbalanced, for example, in a case where only one pixel lights up, such symmetrical display can not be realized.

In view of the foregoing description, attention is given to the fact that the liquid crystal tilt direction can be changed while the symmetry of the optical property in the horizontal direction is maintained, in the present invention. That is, the high transmittance and the tone reversal in the horizontal direction are suppressed by quantitatively obtaining a range of the liquid crystal tilt direction where no tone reversal occurs in the horizontal direction through use of the index Q.

Figure 21A:
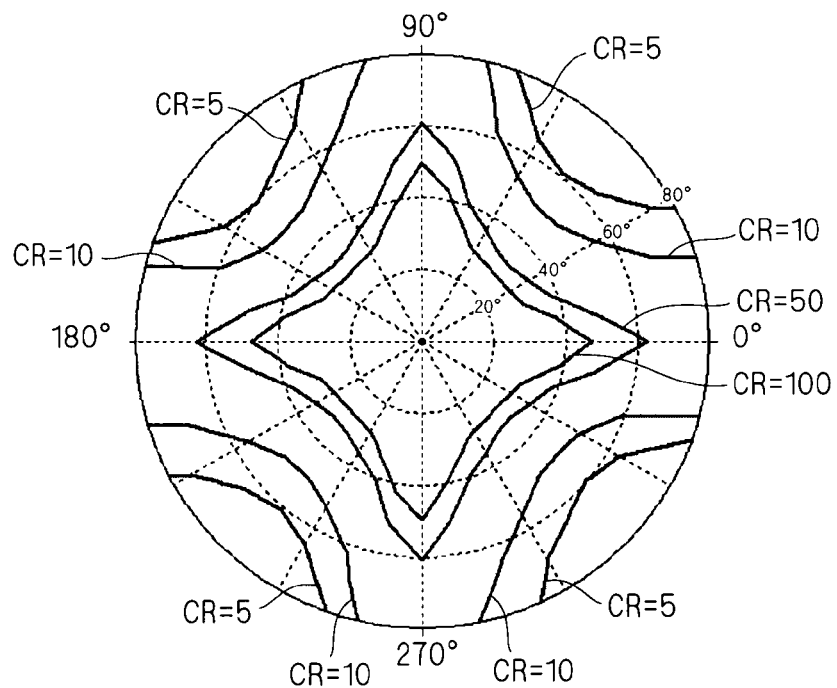
FIG. 21A shows a simulation result of a viewing angle and a viewing direction which are equal in CR to each other in the parameters shown in FIG. 5 in the second embodiment of the present invention.
Figure 21B:
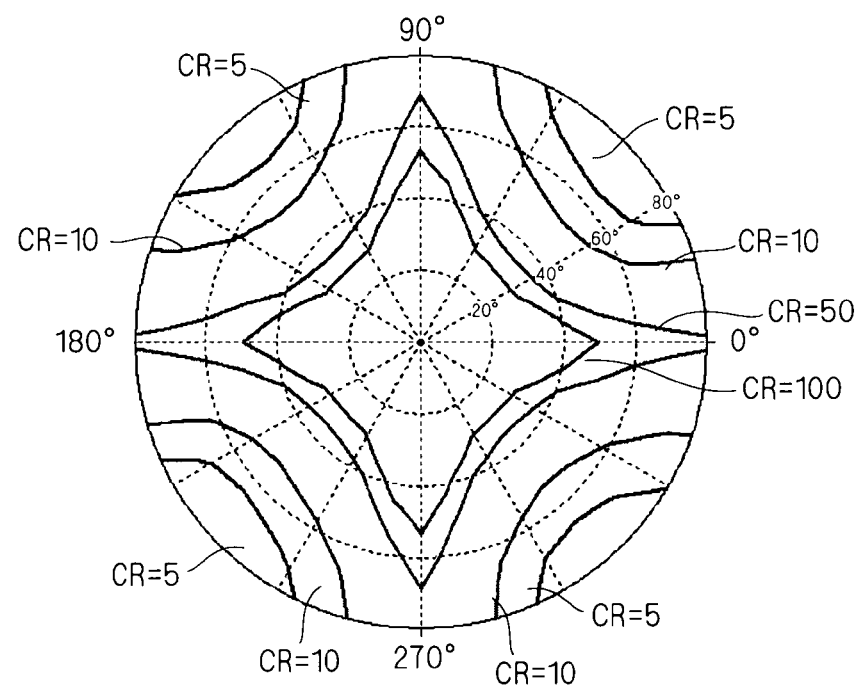
FIG. 21B shows a simulation result of the viewing angle and the viewing direction which are equal in CR to each other in the parameters shown in FIG. 9 in the second embodiment of the present invention.

FIG. 21A shows a simulation result of a viewing angle and a viewing direction which are equal in CR to each other in the parameters shown in FIG. 5 in the second embodiment of the present invention, and FIG. 21B shows a simulation result of a viewing angle and a viewing direction which are equal in CR to each other in the parameters shown in FIG. 9 in the second embodiment of the present invention. In FIGS. 21A and 21B, the liquid crystal tilt direction is 30° in the domain 11A. As shown in FIGS. 21A and 21B, points designated by the viewing angle and the viewing direction which are equal in CR to each other are connected by a line. The liquid crystal tilt direction is displaced by 30° from the horizontal direction. However, the viewing angle property is symmetrical in the horizontal direction and, also, is symmetrical in the vertical direction. It looks like as if the viewing angle property has a rotational symmetry of 90°. As shown in FIG. 21B, however, it is understood that the viewing angle in the horizontal direction is larger than the viewing angle in the vertical direction and, therefore, the viewing angle property has no rotational symmetry of 90° to be precise. That is, in the liquid crystal display device according to the present invention, the rotational symmetry of 90° is not realized unlike a typically known MVA liquid crystal display device having divided four domains, wherein a liquid crystal tilt direction is 45°.

The horizontal direction is invariable with respect to the rotation of 180° about the x axis. As shown in FIGS. 5 and 9, therefore, even when the polarizing plate, the retardation plate and the liquid crystal layer in the circularly polarizing MVA liquid crystal display device where no tone reversal occurs in the horizontal direction are reversed, no tone reversal occurs in the horizontal direction. When the liquid crystal layer is rotated by 180° about the x axis, a sign of the liquid crystal tilt direction is inverted. That is, if the liquid crystal tilt direction in the domain 11A falls within a range between −26° and −42°, preferably a range between −27° to −34°, no tone reversal occurs in the horizontal direction. The optical property is inverted in the vertical direction. In the circularly polarizing MVA liquid crystal display device in which the divided two domains are different in liquid crystal tilt direction from each other by 180°, however, the optical property is symmetrical in the viewing directions which are different from each other by 180°. In the circularly polarizing MVA liquid crystal display device in which no tone reversal occurs originally in the vertical direction, therefore, no tone reversal occurs in the vertical direction even when the constituent components are reversed as described above. That is, when the liquid crystal tilt direction in the domain 11A is set within a range between −48° and −64°, preferably a range between −56° and −63° with respect to the x axis, no tone reversal occurs in the vertical direction.

As described above, the liquid crystal tilt direction can be controlled by the control structure such as the bump or the slit. Basically, the liquid crystal tilt direction is controlled such that the liquid crystal in the domain interposed between the control structures in the control structure extension direction tilts in the direction orthogonal to the control structure extension direction of the control structure (in this specification, even in a case where the respective control structures are provided on separate substrates, respectively, if the control structures are seen from the front side as if the control structures adjoin to each other, the control structures are defined as adjoining control structures.) As described in Patent Document 2, however, the liquid crystal tilt direction can be controlled in the direction parallel with the control structure extension direction in such a manner that a gap between the control structures is made narrower. In any cases, desirably, the liquid crystal tilt direction is evenly controlled in a wider domain of the opening. In order to achieve the control, preferably, the control structure extension direction of the control structure is made longer as much as possible. However, the angle formed by the control structure extension direction of the control structure and the x axis falls within the range described above. As described in Patent Document 2, moreover, in a case where the control structure extension direction of the control structure in the target domain is not parallel with the control structure extension direction of the control structure in the domain adjoining to the target domain when being seen from the front side, the liquid crystal in the target domain tilts in a direction orthogonal to an average of the angle formed by the control structure extension direction of the control structure in the adjoining domain and the x axis (in the case where the liquid crystal tilt direction is controlled in the direction orthogonal to the control structure extension direction) or tilts in a direction parallel with the average of the angle formed by the control structure extension direction of the control structure in the adjoining domain and the x axis (in the case where the liquid crystal tilt direction is controlled in the direction parallel with the control structure extension direction). Therefore, in the case where the control structure extension direction of the control structure in the target domain is not parallel with the control structure extension direction of the control structure in the domain adjoining to the target domain when being seen from the front side, preferably, the average of the angle formed by the control structure extension direction of the structure in the target domain and the x axis falls within the range described above.

In the circularly polarizing MVA liquid crystal display device in which the domain 11A and the domain 11B are different from each other in terms of the tilt direction of the liquid crystal upon application of the voltage to the liquid crystal by almost 180°, the domain 11C is different from the domain 11A in terms of the tilt direction of the liquid crystal upon application of the voltage to the liquid crystal, the domain 11D is different from the domain 11C in terms of the tilt direction of the liquid crystal upon application of the voltage to the liquid crystal by almost 180°, and the angle formed by the liquid crystal tilt direction in the domain 11C and the positive direction of the x axis in the case where the angle formed by the liquid crystal tilt direction in the domain 11A and the positive direction of the x axis is defined as $\phi$ is 180°−$\phi$, as described above, the liquid crystal tilt direction in the domain 11A is set within the range between 26° and 42°, preferably the range between 27° and 34° with respect to the x axis, so that no tone reversal occurs in the horizontal direction of the liquid crystal display device. Further, the liquid crystal tilt direction in the domain 11A is set within the range between 48° and 64°, preferably the range between 56° and 63° with respect to the x axis, so that no tone reversal occurs in the vertical direction of the liquid crystal display device.

Third Embodiment

In the first and second embodiments, the number of retardation plates having the slow axis is four (FIG. 1). A condition for obtaining a high CR in the case where the liquid crystal display device is seen from the front side includes the fact that the slow axis of the retardation plate 5 and the slow axis of the retardation plate 6 are orthogonal to each other and the slow axis of the retardation plate 7 and the slow axis of the retardation plate 8 are orthogonal to each other. Moreover, the condition described above also includes the fact that the retardation of the retardation plate 5 and the retardation of the retardation plate 6 are equal to each other and the retardation of the retardation plate 7 and the retardation of the retardation plate 8 are equal to each other. However, it is difficult to strictly satisfy the condition.

In practical use, an allowance of the axial direction is ±10° and an allowance of the retardation is ±30 nm. However, a liquid crystal display device having a higher CR is more preferable. The circularly polarizing MVA liquid crystal display device may not include the retardation plate 7 and the retardation plate 8. Since the number of retardation plates is small, the number of factors causing degradation of a CR decreases, which is advantageous in production of a liquid crystal display device having a higher CR. Moreover, the small number of retardation plates offers an advantage that a liquid crystal display device can be made small in thickness.

Figures 22, 23:
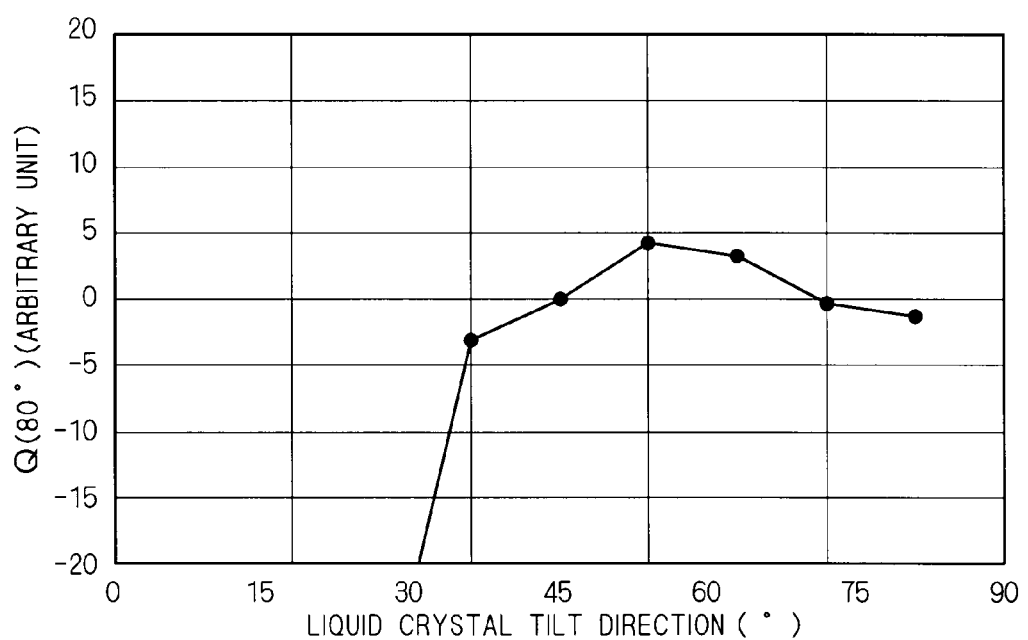
FIG. 22 shows parameters of respective constituent components of a liquid crystal display device according to a third embodiment of the present invention.
FIG. 23 shows a simulation result of an index Q(80°) in the liquid crystal display device according to the third embodiment of the present invention.

Constituent components of a liquid crystal display device according to the third embodiment of the present invention correspond to those shown in FIG. 1 except the retardation plate 7 and the retardation plate 8. In other words, first and second retardation plates 5 and 6 are provided in place of the first, second, third and fourth retardation plates 7, 5, 8 and 6 shown in FIG. 1. As in the first embodiment of the present invention, a liquid crystal layer has two domains 11a and 11b which are different in liquid crystal tilt direction from each other by 180°. FIG. 22 shows parameters of the respective constituent components of the liquid crystal display device according to the third embodiment of the present invention. FIG. 23 shows a simulation result of an index Q(80°) in the liquid crystal display device according to the third embodiment of the present invention. Herein, the parameters shown in FIG. 22 are used. In the third embodiment of the present invention, both the retardation plate 7 and the retardation plate 8 are not used for obtaining a higher CR. Therefore, it is considered that a range of a viewing angle where no tone reversal occurs is set at 80° requested most frequently. In FIG. 23, an abscissa represents a liquid crystal tilt direction $\phi$ in the domain 11a, and the liquid crystal tilt direction $\phi$ is calculated for each interval of 5°. It is assumed herein that the domain 11a and the domain 11b are equal in area to each other. Moreover, scaling is performed by multiplying an ordinate by an appropriate positive value such that the index Q(80°) takes a one-digit numeric value or a two-digit numeric value. A range of the liquid crystal tilt direction in which a relation of Q(80°)>0 is established is obtained in such a manner that points obtained by calculation are interpolated by a straight line. Thus, a range between 24.9° and 39.5° is obtained.

Accordingly, when the liquid crystal tilt direction in one of the domain 11a and the domain 11b which are different in liquid crystal tilt direction from each other by 180° is set within a range between 25° and 39°, no tone reversal in a horizontal direction occurs within a range of a viewing angle up to 80°. As shown in FIG. 23, the most preferable maximum value of the index Q(80°) is 30°±4° since the liquid crystal tilt direction falls within a range less than 30°±5°.

As in the first embodiment of the present invention, when the liquid crystal tilt direction is set at a supplementary angle of 90°, that is, set within a range between 51° to 65°, no tone reversal occurs in a vertical direction. As in the first embodiment of the present invention, the same advantage can be obtained even when a sign of the value of the angle is inverted.

Figure 24:
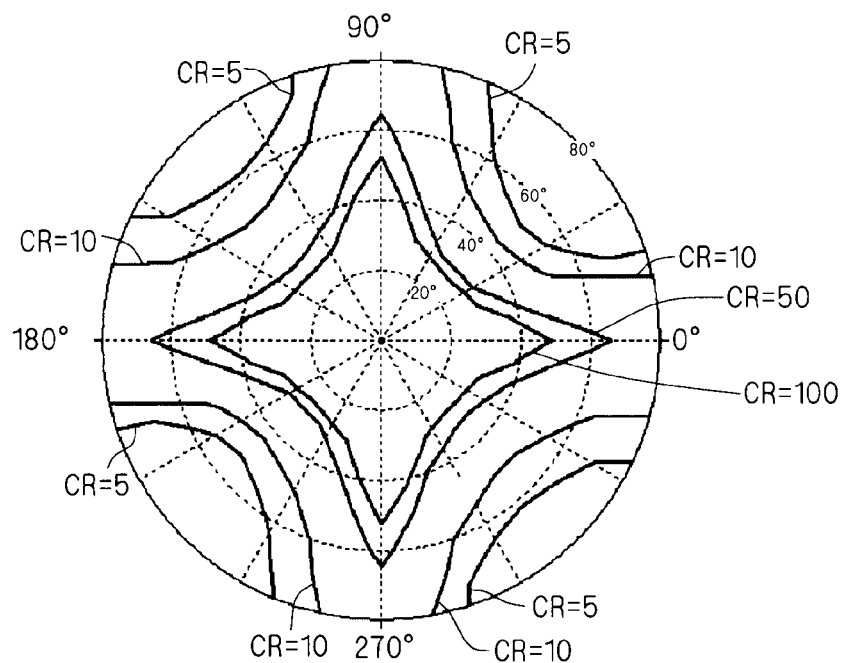
FIG. 24 shows a simulation result of a viewing angle and a viewing direction which are equal in CR to each other in the parameters shown in FIG. 22 in the third embodiment of the present invention.

FIG. 24 shows a simulation result of a viewing angle and a viewing direction which are equal in CR to each other in the parameters shown in FIG. 22 in the third embodiment of the present invention. Herein, the liquid crystal tilt direction is set at 30° in the domain 11a. When a point in a circle is represented by a polar coordinate (r, $\phi$), a radius vector r is proportional to the viewing angle. When the radius vector r is equal to zero, the viewing angle becomes 0°. A maximum value of the radius vector r corresponds to the viewing angle of 80°. Moreover, an azimuth angle $\phi$ corresponds to the viewing direction. When the azimuth angle $\phi$ is equal to 0°, the viewing direction corresponds to the right direction (the right direction in the figure). As shown in FIG. 24, points designated by the viewing angle and the viewing direction which are equal in CR to each other are connected by a line. The liquid crystal tilt direction is displaced by 30° from the horizontal direction. However, the viewing angle property is symmetrical in the horizontal direction and, also, is symmetrical in the vertical direction.

In comparison with the first embodiment of the present invention (FIG. 14), the viewing angle in a direction of 45°, the viewing angle in a direction of 135°, the viewing angle in a direction of 225° and the viewing angle in a direction of 315° are narrow in the viewing direction. In a use of the liquid crystal display device on assumption that a user sees the device from various directions, such as a surveillance monitor, such a narrow viewing angle is disadvantageous. However, in a use of the liquid crystal display device according to the present invention which gives priority to a display property in a specific direction such as a vertical direction or a horizontal direction, such a disadvantage is not problematic.

In FIG. 22, the biaxial retardation plate is used. However, an a-plate may be used. Alternatively, the a-plate and a c-plate may be used in combination.

Fourth Embodiment

Figure 25:
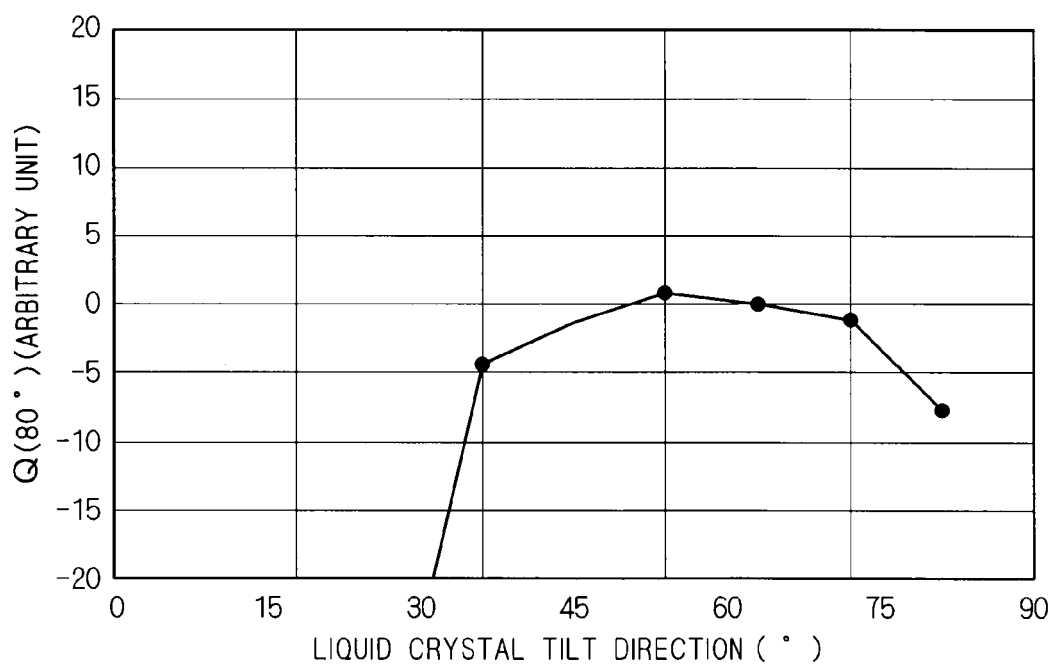
FIG. 25 shows a simulation result of an index Q(80°) in a liquid crystal display device according to a fourth embodiment of the present invention.

Constituent components of a liquid crystal display device according to the fourth embodiment of the present invention correspond to those shown in FIG. 1 except the retardation plate 7 and the retardation plate 8. As in the second embodiment of the present invention, a domain 11A and a domain 11B are different from each other in terms of a tilt direction of a liquid crystal upon application of voltage to the liquid crystal by almost 180°, a domain 11C is different from the domain 11A in terms of the tilt direction of the liquid crystal upon application of the voltage to the liquid crystal, and a domain 11D is different from the domain 11C in terms of the tilt direction of the liquid crystal upon application of the voltage to the liquid crystal by almost 180°. When an angle formed by the liquid crystal tilt direction in the domain 11A and a positive direction of an x axis is defined as $\phi$, an angle formed by the liquid crystal tilt direction in the domain 11C and the positive direction of the x axis is 180°−$\phi$. FIG. 25 shows a simulation result of an index Q(80°) in the liquid crystal display device according to the fourth embodiment of the present invention. Herein, the parameters shown in FIG. 22 are used. In the fourth embodiment of the present invention, both the retardation plate 7 and the retardation plate 8 are not used for obtaining a higher CR. Therefore, it is considered that a range of a viewing angle where no tone reversal occurs is set at 80° requested most frequently. In FIG. 25, an abscissa represents a liquid crystal tilt direction $\phi$ in the domain 11A, and the liquid crystal tilt direction $\phi$ is calculated for each interval of 5°. It is assumed herein that the domains 11A, 11B, 11C and 11D are equal in area to each other. Moreover, scaling is performed by multiplying an ordinate by an appropriate positive value such that the index Q(80°) takes a one-digit numeric value or a two-digit numeric value. A range of the liquid crystal tilt direction in which a relation of Q(80°)>0 is established is obtained in such a manner that points obtained by calculation are interpolated by a straight line. Thus, a range between 28.1° and 35.2° is obtained.

Accordingly, when the liquid crystal tilt direction in one of the domain 11A and the domain 11B which are different in liquid crystal tilt direction from each other by 180° is set within a range between 29° and 35°, no tone reversal in a horizontal direction occurs within a range of a viewing angle up to 80°.

As in the second embodiment of the present invention, when the liquid crystal tilt direction is set at a supplementary angle of 90°, that is, when the liquid crystal tilt direction is set within a range between 55° to 61°, no tone reversal in a vertical direction occurs. As in the second embodiment of the present invention, the same advantage can be obtained even when a sign of the value of the angle is inverted.

FIG. 26 shows a simulation result of a viewing angle and a viewing direction which are equal in CR to each other in the parameters shown in FIG. 22 in the fourth embodiment of the present invention. Herein, the liquid crystal tilt direction is set at 30° in the domain 11A. When a point in a circle is represented by a polar coordinate (r, $\phi$), a radius vector r is proportional to the viewing angle. When the radius vector r is equal to zero, the viewing angle becomes 0°. A maximum value of the radius vector r corresponds to the viewing angle of 80°. Moreover, an azimuth angle $\phi$ corresponds to the viewing direction. When the azimuth angle $\phi$ is equal to 0°, the viewing direction corresponds to the right direction (the right direction in the figure). As shown in FIG. 26, points designated by the viewing angle and the viewing direction which are equal in CR to each other are connected by a line. The liquid crystal tilt direction is displaced by 30° from the horizontal direction. However, the viewing angle property is symmetrical in the horizontal direction and, also, is symmetrical in the vertical direction.

In comparison with the second embodiment of the present invention (FIG. 21), the viewing angle in a direction of 45°, the viewing angle in a direction of 135°, the viewing angle of 225° and the viewing angle in a direction of 315° are narrow in the viewing direction. In a use of the liquid crystal display device on assumption that a user sees the device from various directions, such as a surveillance monitor, such a narrow viewing angle is disadvantageous. However, in a use of the liquid crystal display device according to the present invention which gives priority to a display property in a specific direction such as a vertical direction or a horizontal direction, such a disadvantage is not problematic.

In FIG. 22, the biaxial retardation plate is used. However, an a-plate may be used. Alternatively, the a-plate and a c-plate may be used in combination.

While the invention has been shown and described in detail, the foregoing description is in all aspects illustrative and not restrictive. It is therefore understood that numerous modifications and variations can be devised without departing from the scope of the invention.

What is claimed is:

1. A liquid crystal display device comprising:
   a first substrate that has electrodes provided at regular intervals to apply a voltage to liquid crystal;
   a second substrate that has an electrode to apply the voltage to the liquid crystal;
   a liquid crystal layer that is held between said first substrate and said second substrate and is made of the liquid crystal, the liquid crystal being aligned in a substantially vertical direction with respect to a substrate plane and of a negative type;
   a first polarizing plate that is provided at a side which is different from a liquid crystal side of said first substrate;
   a second polarizing plate that is provided at a side which is different from a liquid crystal side of said second substrate, and has a transmission axis which is orthogonal to a transmission axis of said first polarizing plate;
   a first retardation plate that is provided between said first substrate and said first polarizing plate, and has a slow axis which is not parallel or orthogonal to the transmission axis of said first polarizing plate;
   a second retardation plate that is provided between said first substrate and said first retardation plate;
   a third retardation plate that is provided between said second substrate and said second polarizing plate, and has a slow axis which is orthogonal to the slow axis of said first retardation plate;
   a fourth retardation plate that is provided between said second substrate and said third retardation plate, and has a slow axis which is orthogonal to a slow axis of said second retardation plate;
   a control structure that is provided at each of or one of the liquid crystal side of said first substrate and the liquid crystal side of said second substrate, and is configured to control a tilt direction of the liquid crystal upon application of the voltage to said liquid crystal layer;
   a first domain where the liquid crystal is configured to tilt in one direction upon application of the voltage to said liquid crystal layer; and
   a second domain where the liquid crystal is configured to tilt in a direction which is different from the tilt direction of the liquid crystal in said first domain by substantially 180°, wherein
   an angle formed by the tilt direction of the liquid crystal in said first domain and a horizontal direction of a screen in said liquid crystal display device falls within a range between 22° and 39° or a range between 51° and 68°.

2. The liquid crystal display device according to claim 1, wherein an angle formed by the horizontal direction of the screen in said liquid crystal display device and a control structure extension direction of said control structure falls within a range between 22° and 39°.

3. The liquid crystal display device according to claim 1, wherein an angle formed by the horizontal direction of the screen in said liquid crystal display device and a control structure extension direction of said control structure falls within a range between 51° and 68°.

4. The liquid crystal display device according to claim 1, further comprising:
a third domain where the liquid crystal is configured to tilt in a direction which is different from the tilt direction of the liquid crystal in said first domain; and
a fourth domain where the liquid crystal is configured to tilt in a direction which is different from the tilt direction of the liquid crystal in said third domain by substantially 180°, wherein
when the angle formed by the tilt direction of the liquid crystal in said first domain and the horizontal direction of the screen in said liquid crystal display device is defined as $\Phi$, an angle formed by the tilt direction of the liquid crystal in said third domain and the horizontal direction of the screen in said liquid crystal display device is 180°−$\Phi$, and the angle $\Phi$ falls within a range between 26° and 42° in place of the range between 22° and 39° or a range between 48° and 64° in place of the range between 51° and 68°.

5. The liquid crystal display device according to claim 4, wherein when an angle formed by the horizontal direction of the screen in said liquid crystal display device and a control structure extension direction of said control structure in said first domain is defined as $\Phi$, the angle formed by the tilt direction of the liquid crystal in said third domain and the horizontal direction of the screen in said liquid crystal display device is 180°−$\Phi$, and the angle $\Phi$ falls within the range between 26° and 42°.

6. The liquid crystal display device according to claim 4, wherein when an angle formed by the horizontal direction of the screen in said liquid crystal display device and a control structure extension direction of said control structure in said first domain is defined as $\Phi$, the angle formed by the tilt direction of the liquid crystal in said third domain and the horizontal direction of the screen in said liquid crystal display device is 180°−$\Phi$, and the angle $\Phi$ falls within the range between 48° and 64°.

7. A liquid crystal display device comprising:
a first substrate that has electrodes provided at regular intervals to apply a voltage to liquid crystal;
a second substrate that has an electrode to apply the voltage to the liquid crystal;
a liquid crystal layer that is held between said first substrate and said second substrate and is made of the liquid crystal, the liquid crystal being aligned in a substantially vertical direction with respect to a substrate plane and of a negative type;
a first polarizing plate that is provided at a side which is different from a liquid crystal side of said first substrate;
a second polarizing plate that is provided at a side which is different from a liquid crystal side of said second substrate, and has a transmission axis which is orthogonal to a transmission axis of said first polarizing plate;
a first retardation plate that is provided between said first substrate and said first polarizing plate, and has a slow axis which is not parallel or orthogonal to the transmission axis of said first polarizing plate;
a second retardation plate that is provided between said second substrate and said second polarizing plate, and has a slow axis which is orthogonal to the slow axis of said first retardation plate;
a control structure that is provided at each of or one of the liquid crystal side of said first substrate and the liquid crystal side of said second substrate, and is configured to control a tilt direction of the liquid crystal upon application of the voltage to said liquid crystal layer;
a first domain where the liquid crystal is configured to tilt in one direction upon application of the voltage to said liquid crystal layer; and
a second domain where the liquid crystal is configured to tilt in a direction which is different from the tilt direction of the liquid crystal in said first domain by substantially 180°, wherein
an angle formed by the tilt direction of the liquid crystal in said first domain and a horizontal direction of a screen in said liquid crystal display device falls within a range between 25° and 39° or a range between 51° and 65°.

8. The liquid crystal display device according to claim 7, wherein an angle formed by the horizontal direction of the screen in said liquid crystal display device and a control structure extension direction of said control structure falls within a range between 25° and 39°.

9. The liquid crystal display device according to claim 7, wherein an angle formed by the horizontal direction of the screen in said liquid crystal display device and a control structure extension direction of said control structure falls within a range between 51° and 65°.

10. The liquid crystal display device according to claim 7, further comprising:
a third domain where the liquid crystal is configured to tilt in a direction which is different from the tilt direction of the liquid crystal in said first domain; and
a fourth domain where the liquid crystal is configured to tilt in a direction which is different from the tilt direction of the liquid crystal in said third domain by substantially 180°, wherein
when the angle formed by the tilt direction of the liquid crystal in said first domain and the horizontal direction of the screen in said liquid crystal display device is defined as $\Phi$, an angle formed by the tilt direction of the liquid crystal in said third domain and the horizontal direction of the screen in said liquid crystal display device is 180°−$\Phi$, and the angle $\Phi$ falls within a range between 29° and 35° in place of the range between 25° and 39° or a range between 55° and 61° in place of the range between 51° and 65°.

11. The liquid crystal display device according to claim 10, wherein when an angle formed by the horizontal direction of the screen in said liquid crystal display device and a control structure extension direction of said control structure in said first domain is defined as $\Phi$, the angle formed by the tilt direction of the liquid crystal in said third domain and the horizontal direction of the screen in said liquid crystal display device is 180°−$\Phi$, and the angle $\Phi$ falls within the range between 29° and 35°.

12. The liquid crystal display device according to claim 10, wherein when an angle formed by the horizontal direction of the screen in said liquid crystal display device and a control structure extension direction of said control structure in said first domain is defined as $\Phi$, the angle formed by the tilt direction of the liquid crystal in said third domain and the horizontal direction of the screen in said liquid crystal display device is 180°−$\Phi$, and the angle $\Phi$ falls within the range between 55° and 61°.

* * * * *